United States Patent [19]

Frievalt

[11] Patent Number: 5,533,385
[45] Date of Patent: Jul. 9, 1996

[54] PACKAGE SEAL INTEGRITY TESTING DEVICE AND METHOD OF OPERATION THEREOF

[76] Inventor: William Frievalt, 6425 Shady Oaks La., Plano, Tex. 75093

[21] Appl. No.: 383,949

[22] Filed: Feb. 6, 1995

[51] Int. Cl.⁶ .............. G01M 3/36; G01M 3/02; B07C 1/10
[52] U.S. Cl. .............. 73/49.3; 73/41.3; 73/52.0; 73/45.4; 209/523
[58] Field of Search ............... 73/49.3, 41.3, 73/41.0, 45.4, 52.0; 209/523

[56] References Cited

U.S. PATENT DOCUMENTS

| | | | |
|---|---|---|---|
| 2,712,408 | 7/1955 | Weber | 226/95 |
| 2,922,519 | 1/1960 | Radley | 209/111 |
| 3,430,766 | 3/1969 | Stone | 209/111.7 |
| 3,606,014 | 9/1971 | Linn | 209/79 |
| 3,837,215 | 9/1974 | Massage | 73/45.4 |
| 3,918,293 | 11/1975 | Feigel | 73/49.3 |
| 3,998,091 | 12/1976 | Paquette et al. | 73/52 |
| 4,044,891 | 8/1977 | Pynsky | 209/73 |
| 4,510,730 | 4/1985 | Edmondson | 53/53 |
| 4,649,740 | 3/1987 | Franklin | 73/49.3 |
| 4,671,101 | 6/1987 | Franklin | 73/49.3 |
| 4,697,452 | 10/1987 | Prakken | 73/49.3 |
| 4,715,215 | 12/1987 | Perhach et al. | 73/49.3 |
| 4,771,630 | 9/1988 | Croce et al. | 73/49.3 |
| 4,862,732 | 9/1989 | Raymond et al. | 73/45.4 |
| 4,901,558 | 2/1990 | Leining et al. | 73/49.3 |
| 4,930,345 | 6/1990 | Bausch | 73/45.4 |
| 4,955,226 | 9/1990 | Beaty et al. | 73/49.3 |
| 5,230,239 | 7/1993 | Gentile | 73/49.3 |
| 5,309,750 | 5/1994 | Riley | 73/52 |

*Primary Examiner*—Thomas P. Noland
*Assistant Examiner*—J. David Wiggins
*Attorney, Agent, or Firm*—Antonelli, Terry, Stout & Kraus

[57] ABSTRACT

A process for testing seal quality and height of flexible packages in accordance with the invention includes the following steps. Positioning a package to be tested at a test station. Initially moving a loading device into contact with the flexible package in a direction which applies an increasing load to a fluid within the package with the load applied to the package being sensed with a sensing device. Moving the loading device an initial distance in the direction which causes the sensed load to equal a set load. Defining as a reference position of the loading device an actual position of the loading device when the set load is sensed by the sensing device. Stopping movement of the loading device when the set load has been sensed by the sensing device for a time interval sufficient to permit the package to expand at the test station which drops the load sensed by the sensing device below the set load. Moving the loading device an additional distance from the reference position in the same previously defined direction to further decrease the height of the package where the set load is applied to the package. Accepting the package if the movement of the loading device the additional distance from the reference position causes the load sensed by the sensing device to at least equal the set load and the additional distance of movement from the reference position falls within a set range defining an acceptable minimum and maximum height of the package.

39 Claims, 6 Drawing Sheets

PACKAGE SEAL INTEGRITY TESTING DEVICE AND METHOD OF OPERATION THEREOF

TECHNICAL FIELD

The present invention relates to the testing of seal quality and height of flexible packages.

BACKGROUND ART

Flexible sealed plastic bags containing a product, such as foodstuffs, are in widespread usage. These flexible sealed plastic bags contain a gas which is placed in the package to maintain the integrity of the product during storage conditions. Furthermore, the flexible sealed bags must keep the foodstuffs from leaking from the bags. In bags containing foodstuffs, leakage of air into the package permits oxygen to contact the product which produces undesirable oxidation of the product lessening its shelf life. As a result, sealed plastic bags containing foodstuffs, such as potato chips, are inspected for seal defects in the bags, as well as small leaks in the face of the bags. The inspection process is still largely manual in nature. While manual inspection is quite satisfactory for locating defective bags, it has the disadvantage of being time consuming and costly given the labor which is involved.

The most common types of leaks in flexible packages are in the end seals. Often particulate matter, such as food particles, becomes caught on the surface where the end seal is to be made. As a result, when the end seals are being formed, a complete seal cannot be formed because the particulate matter bridges the opposing faces which are to be joined or the seal has insufficient strength because very little surface area of the opposing faces in the vicinity of the seals is actually joined.

Currently, there is a trend in the food industry to use automatic case packing machines which take product after it has been sealed in flexible plastic bags and place it automatically into cases, such as cardboard boxes, without manual intervention. Case packing machines placing product contained in flexible plastic bags operate properly when the product is stacked in a packing configuration. The packing configuration of the stacked bags should fall within a predetermined minimum and maximum height in order for the case packing machine to properly operate.

Furthermore, tests are used in the packing industry to test a whole case of packed product contained in flexible packages to detect so-called "microleaks" in the face of the package. This process is usually performed by manual submersion of the product into water to detect for the presence of bubbles being expelled out of the package when the package is pressurized by the person submerging the package. If any "microleaks" are found, the whole case of flexible packages is rejected which is indicative of the packaging material being used in a packaging line having a fault which requires the shut-down of the automatic packing line.

Certain automated devices have been developed for checking the integrity of seals on plastic bags which are packaged in an automatic packaging line. U.S. Pat. No. 4,649,740 discloses an apparatus and method for testing leaks in packages. The device disclosed in the '740 patent has a series of measuring stations through which bags are moved during the testing process. A group of probes are lowered into contact with the inflated bags at each of the series of stations. An encoding mechanism determines if at successive stations the contacting of the packages with the probes causes a significant decrease in the height of the package which is indicative of a faulty package. The device of the '740 patent does not check if the bags fall within a height tolerance between a minimum and a maximum height. U.S. Pat. No. 4,697,452 discloses an apparatus for testing the integrity of sealed packages. The device disclosed in the '452 patent checks to determine if a bag leaks under application of pressure applied by a movable arm or a fixed shoe. The apparatus of the '452 patent does not check for the bags being within a height tolerance between a minimum and a maximum height. U.S. Pat. No. 4,955,226 discloses a method and apparatus for automatically detecting the presence of holes in sealed plastic bags. The apparatus of the '226 patent initially loads the bag with a first movable member which moves downwardly into contact with the bag to expand the bag. Thereafter, a movable plate is lowered into contact with the bag while the bag is still under pressure from the first movable member. A displacement transducer contacts the bags which has a pair of tips which are displaced vertically upward in response to the lowering of the plate in contact with the bag. The sensed upward movement of the transducer tips is compared with the response which is produced by a bag without leaks to determine if seal integrity is present. The device of the '226 patent does not check if the bags fall within a height tolerance between a minimum and a maximum height. The device of the '226 patent is not designed to detect pinhole leaks which are leaks which are so small that an appreciably measurable amount of air cannot be measured from coming out of the bags in response to the lowering of the load device.

A significant need exists today for a device which permits the in-line testing of flexible package integrity and height at high throughputs such as 60 bags per minute which are typical of the throughput of automatic packaging lines for flexible packages containing a wide range of substances.

Furthermore, the usage of sealed, flexible plastic bags is becoming much more widespread than their long-standing use in the food industry. For example, water-soluble pouches are now used to package fertilizer and pesticides. The water-soluble pouch is packed within another plastic bag which is ripped open when it is desired to use the fertilizer or pesticide. These packages contain hazardous materials which are not intended to contact the user who is opening the packages to place the inner water-soluble bag into liquid to dissolve it. Additionally, other types of sealed plastic bags containing fluids, such as IV bags and disposable contact lenses, are becoming more widespread in use which also must be tested for seal integrity desirably at a high throughput rate achieved during an in-line packaging process.

Furthermore, a need exists for a device which automatically checks, as part of an automated packaging process, seal integrity of flexible plastic packages as well as determining if the flexible packages fall within acceptable height specifications to facilitate the use of automatic case packaging machines. The checking of flexible packages for leaks and height tolerance at a single testing station in-line with a packaging process would permit a higher production throughput to be achieved as well as insuring high quality packaging at reduced cost.

DISCLOSURE OF INVENTION

The present invention is a process for testing seal quality and height of flexible packages and an apparatus for testing quality and height of flexible packages. Furthermore, the present invention provides a process for testing seal quality over an extended time interval to detect "microleaks" which cannot be tested during an in-line packaging process where seal quality and height of flexible packages are being tested.

As used herein, the term "flexible packaging" is used to describe any fluid-tight package having walls which flex under load such as, but not limited to, flexible plastic packages of the type discussed above.

The present invention utilizes a movable loading device which contacts a flexible package at a testing station to first expand the flexible package under a set load for a time interval sufficient to permit the package to completely elastically expand. This elastic expansion drops the load sensed by a load sensing device below the set load which was applied by the loading device measured by the load sensing device during contact of the loading device with the flexible package being tested. The useful effect of this initial expansion of the flexible package is to normalize the response characteristic of the flexible package during a subsequent application of the set load used to simultaneously test seal integrity and compliance with height specifications of flexible packages. The subsequent application of the set load is produced by moving the loading device an additional distance from the reference position at which the flexible package was first expanded elastically under application of the set load. The distance of movement of the loading device, until the sensing device again reaches the set load, is precisely measured to determine if the flexible package has acceptable seal integrity and falls within acceptable minimum and maximum height specifications. Furthermore, if the application of the applied load to the flexible package during the subsequent loading step through a set distance does not cause the flexible package to be loaded to a point where the sensing device again senses the set load, the package is rejected as having an unacceptable seal integrity. Furthermore, the flexible package is rejected if the distance which the loading device moves during the subsequent loading step to achieve the set load is outside of the set minimum and maximum heights of the flexible package. By rejecting packages which do not fall within acceptable heights, as defined by minimum and maximum height specifications, the present invention facilitates the use of automatic case packaging machines which require stacks of multiple packages to fall within a set height range to facilitate packing.

The present invention may also be used to detect microleaks. The overall operational sequence is similar to that used for testing seal quality and height of flexible packages except that after the initial elastic expansion of the package and after the sensing of the set load is achieved, the loading device is used to apply additional loading to the flexible package during a testing time interval. The testing time interval is much longer than that used for testing for seal integrity and height compliance and may be 10 seconds in duration for the purpose of trying to expel fluid from the flexible package to determine if "microleaks" are present. If a drop in the sensed load is detected during the additional loading step applied during the testing time interval, the package may be rejected as one containing unacceptable microleaks. Otherwise, the package may be accepted if the sensing device does not detect a drop in the load sensed over the testing time interval.

The preferred application of this process repeatedly stops the loading device followed by application of additional load to the flexible package during another time interval sufficient such as, but not limited to, 10 seconds to permit the package to fully expand elastically if the package was not fully elastically expanded by the initial loading step. The purpose of this subsequent loading step(s) is to eliminate the possibility that the first loading step is not sufficient to totally elastically expand the package which must be achieved in order for an accurate testing of microleaks to be achieved given the fact that further elastic expansion of the package during the subsequent loading step(s) would cause the sensed load to drop which produces a misleading response characteristic indicative of a package containing unacceptable microleaks. After the second loading step to further eliminate the possibility of the flexible package not being totally elastically expanded, the flexible package is loaded by moving the loading device another additional distance during another testing time interval to determine if any drop in the sensed load occurs. Any dropping of the sensed load is indicative of unacceptable microleaks being present. If the sensed load does not drop during the additional testing time interval, the flexible bag is considered to be acceptable. The stopping of the loading device followed by the movement of additional distances can be repeated as many times as necessary in order to insure that the bag is totally elastically expanded prior to determining if fluid (gas, liquid or a mixture thereof) is expelled under the application of additional load applied by the loading device.

The apparatus of the present invention for testing quality and height of flexible packages permits the aforementioned process for testing quality and height of flexible packages to be performed in-line with production equipment for packaging flexible packages such as the type discussed above which are in widespread usage in the food industry, etc. The controller of the apparatus of the present invention permits the integrated control of conveyor systems for conveying flexible packages to and from the test station where testing is performed and the activation of an automatic case packaging machine so as to achieve the aforementioned high throughput capability for testing both the seal integrity and height of flexible packages.

A process for testing seal quality and height of flexible packages in accordance with the invention includes positioning a package to be tested at a test station; initially moving a loading device into contact with the flexible package in a direction which applies an increasing load to a fluid within the package with the load applied to the package being sensed with a sensing device; moving the loading device an initial distance in the direction which causes the sensed load to equal a set load; defining as a reference position of the loading device an actual position of the loading device when the set load is sensed by the sensing device; stopping movement of the loading device when the set load has been sensed by the sensing device for a time interval sufficient to permit the package to expand at the test station which drops the load sensed by the sensing device below the set load; moving the loading device an additional distance from the reference position in the same previously defined direction to further decrease the height of the package where the set load is applied to the package; and accepting the package if the movement of the loading device the additional distance from the reference position causes the load sensed by the sensing device to at least equal the set load and the additional distance of movement from the reference position falls within a set range defining an acceptable minimum and maximum height of a package. Furthermore, the process may include rejecting the package if the movement of the loading device from the reference position the additional distance does not cause the sensed load to at least equal the set load or if the sensed load at least equals the set load and the movement of the loading device the additional distance from the reference position does not fall within the range defining the acceptable minimum and maximum height of the package. Furthermore, the process may include positioning sequentially in time a plurality of packages at the test station with a conveyor system with each of the preceding steps up through the rejecting of the package being repeated for each of the plurality of packages positioned at the test station; and packing a plurality of the accepted packages within a case using a case packing machine with the packages being stacked by the case packing machine in a predetermined stacked packaging configuration with a total height of the plurality of the accepted packages in the stacked packing configuration falling within a permissible range of height of the stacked packing configuration between a minimum and a maximum for which the case packing machine operates without packing error. The set load, minimum height, maximum height and additional distance may be programmed into a controller of an apparatus controlling the process for positioning of the package at the test station. In a preferred embodiment of the invention the moving of the loading device may be powered by a stepping motor and the sensing of the load on the flexible package is sensed with a strain gauge. Furthermore, in a preferred embodiment of the invention the packages are provided to the conveyor system by a packaging machine.

The set range may be determined by testing a plurality of packages with the set load and determining the additional distance of movement of the sensing device at which the sensed load is measured to have been reached; and setting the set range as a function of the determined additional distance. The set range as a function of the predetermined additional distance is preferably an average of the predetermined additional distance of each of the test plurality of all accepted packages.

The flexible packages may without limitation contain solid foodstuffs and gas, a liquid and a gas, or a solid and a gas.

A process for testing seal quality of a flexible package in accordance with the invention includes positioning a package to be tested at a test station; initially moving a loading device into contact with the flexible package in a direction which applies an increasing load to a fluid within the package with the load applied to the package being sensed with a sensing device; moving the loading device an initial distance in the direction which causes the sensed load to equal a set load; stopping movement of the loading device when the set load has been sensed by the sensing device for a time interval sufficient to permit the package to expand at the test station which drops the load sensed by the sensing device below the set load; moving the loading device in the same previously defined direction an additional distance over a testing time interval while sensing the load on the package with the sensing device to expel fluid from the package during the testing time interval if leaks are present in the package; and rejecting the package after completion of moving the loading device the additional distance if the sensing device detects a drop in the load sensed over the testing time interval and accepting the package if the sensing device does not detect a drop in the load sensed over the testing time interval. The process may further include stopping movement of the loading device after moving the loading device the additional distance for another time interval sufficient to permit the package to expand if the package is not fully expanded; moving the loading device in the same previously defined direction another additional distance over another testing time interval to expel fluid from the package during the another testing time interval if leaks are present in the package; and rejecting the package after completion of moving the loading device the another additional distance if the sensing device detects a drop in the load sensed over the another testing time interval and accepting the package if the sensing device does not detect a drop in the load sensed over the another testing time interval. The preceding stopping movement, moving the loading device and rejecting the package steps may be repeated.

An apparatus for testing quality and height of flexible packages in accordance with the invention includes a test station; a load sensor for sensing a load applied to packages at the test station and producing an electrical signal representing the load applied to the packages at the test station; a loading device for applying a load to the packages at the test station; an actuator for moving the loading device in a direction into contact with the flexible packages at the test station which applies an increasing load to a fluid within the packages; a prime mover for providing power to the actuator for causing the actuator to move the loading device; a system for moving the packages to the test station for testing and removing the packages from the test station after testing is completed and for designating the packages as accepted or rejected packages; and a controller, electrically coupled to the load sensor, the prime mover and the system for moving, for determining a position of the loading device, for monitoring the sensed load, for controlling operation of the system for moving, for controlling an application of power to the prime mover to provide power to the actuator to cause movement of the loading device in the direction so that the loading device is initially moved into contact with the flexible package to apply an increasing load to the fluid within the package until the controller receives from the load sensor an electrical signal representing that the sensed load equals a set load, for defining a reference position of the loading device when the set load is sensed to have been reached, for causing movement of the loading device to stop when the set load has been sensed by the sensing device for a time interval sufficient to permit the packages to expand at the test station which drops the load sensed below the set load, for causing the loading device to be moved a distance from the reference position in the same direction, for causing the package to be moved from the test station by the system for moving as an acceptable package if the movement of the loading device from the reference position causes the load sensed by the sensing device to at least equal the set load and the distance of movement from the reference position falls within a set range defining an acceptable minimum and maximum height of the package, and for causing the package to be moved from the test station as a rejected package if the movement by the distance from the reference position does not cause the sensed load to at least equal the set load or if the sensed load at least equals the set load and the movement of the loading device by the distance from the reference position does not fall within the range defining the acceptable minimum and maximum height. The invention further includes a case packing machine, in-line with the system for moving the packages, for packing acceptable packages in a predetermined configuration into cases with a height of a plurality of the accepted packages in the stacked packing configuration falling within a permissible range of height of the stacked packing configuration between at minimum and maximum for which the case packing machine operates without packing error. Preferably, the load sensor is a strain gauge; the prime mover is a stepping servo motor; and the controller is a programmed microprocessor. The controller determines the set range by controlling testing of a plurality of packages with the set load and determines the additional distance of movement of the sensing device at which the set load is sensed to have been reached and sets the set range as a function of the predetermined distance. The function of the predetermined distance is preferably an average of the additional distance for the tested plurality of packages.

BEST MODE FOR CARRYING OUT THE INVENTION

Figure 1:
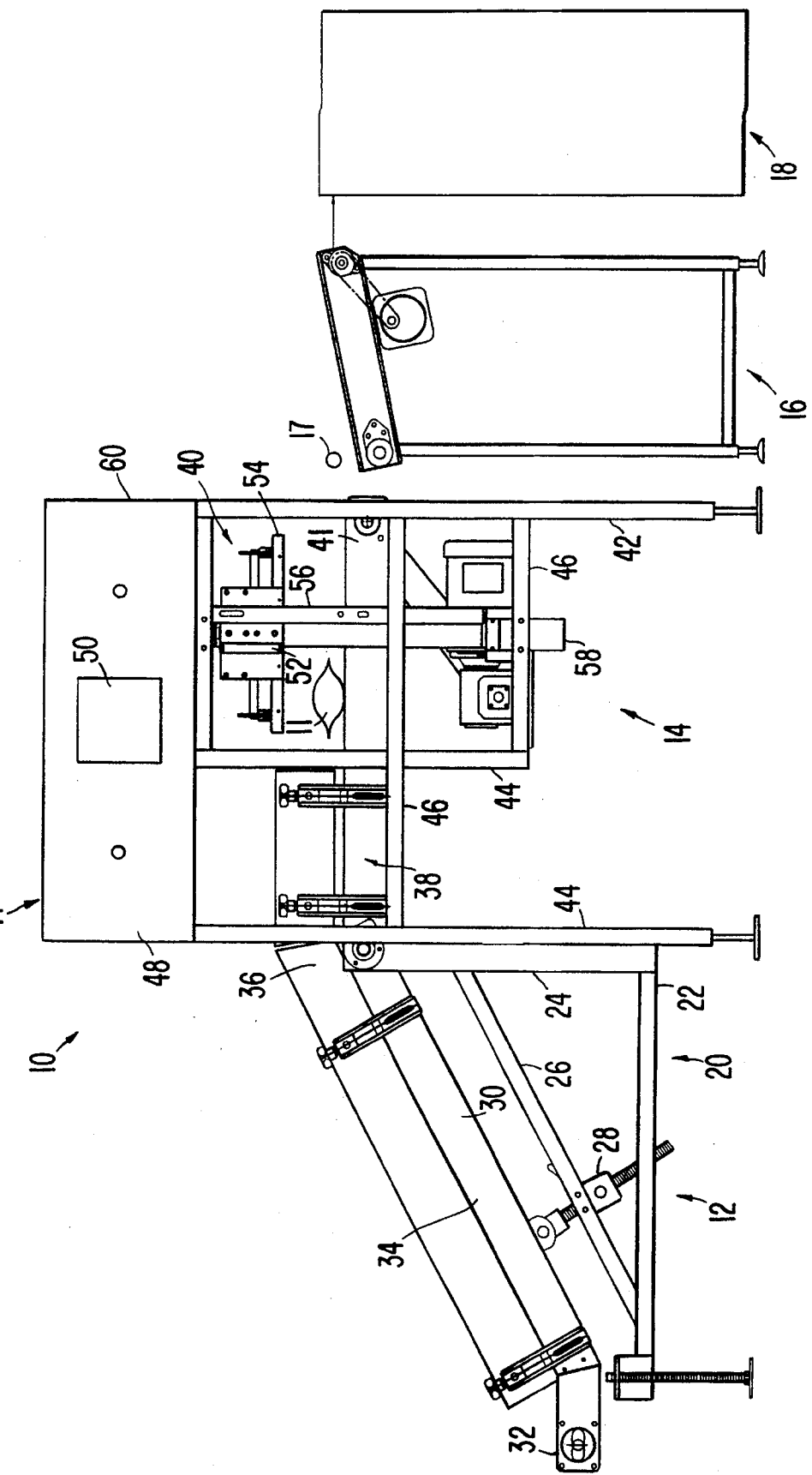
FIG. 1 illustrates an embodiment of an apparatus for testing quality and height of flexible packages and for testing seal quality of flexible packages to determine the presence of microleaks.
Figure 4:
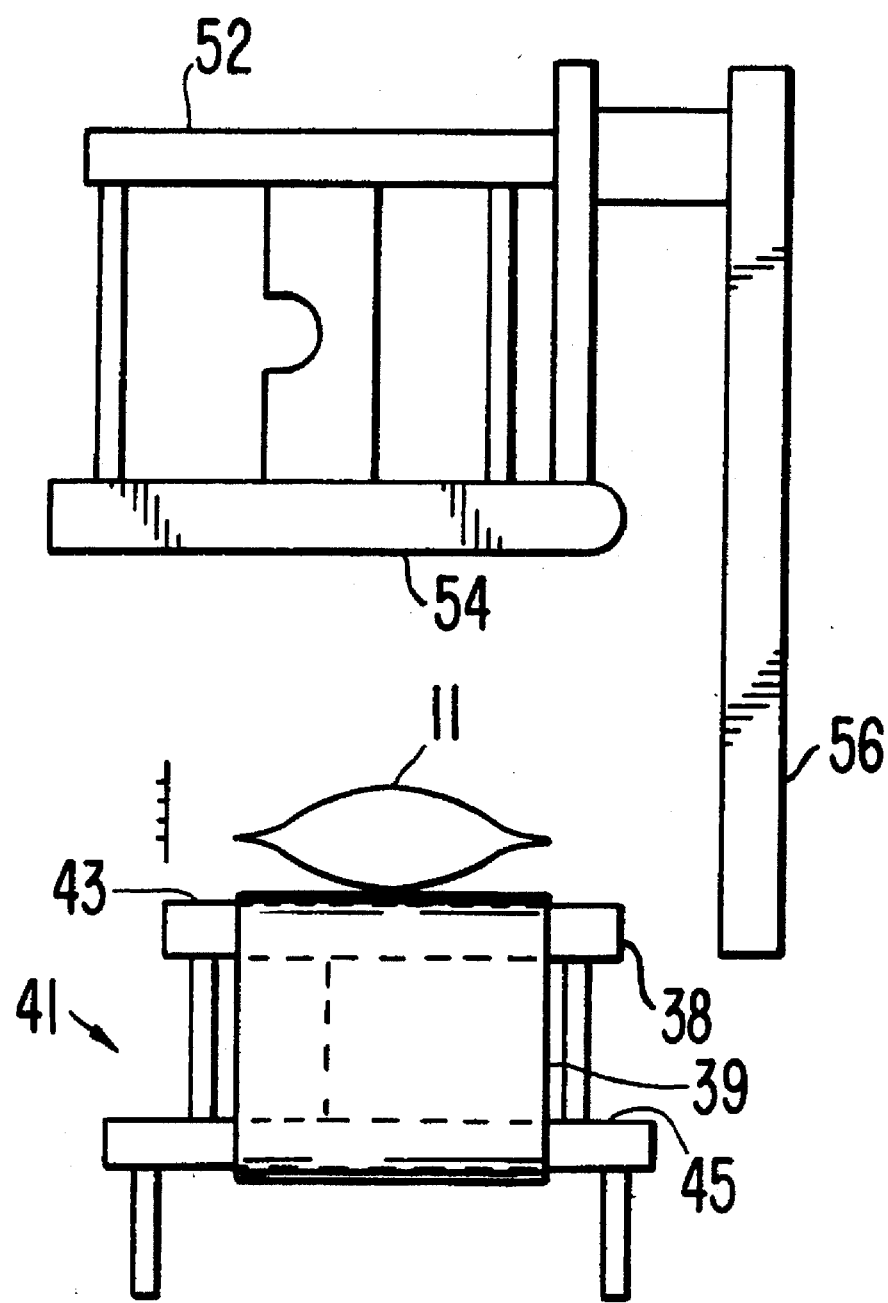
FIG. 4 is an end view of the embodiment of FIG. 1.

The embodiment 10 of the invention, as illustrated in FIGS. 1 and 4, is part of an in-line packaging system for flexible packages 11. The flexible packages may be without limitation used for packing of foodstuffs such as potato chips. The flexible packages 11 contain a fluid which may be either a gas, liquid or a mixture of gas and liquid with or without the presence of solids. The embodiment 10 has several major stations which are an inclined section 12, which is part of a conventional packaging machine of the type which conveys flexible packages such as those containing potato chips or other foodstuffs, a testing station 14 which performs seal quality and height testing of flexible packages as described below, a reject conveyor 16 of conventional construction using a source of compressed air 17 to reject flexible packages which fail the testing sequence described below in conjunction with FIGS. 5–8 which receives tested packages discharged from the testing section and conveys acceptable packages to an auto case packer 18 of conventional construction. The reject conveyor 16 rejects packages by use of a blast of air from source 17, which is controlled by the controller described below, as is conventionally done in the packaging industry.

The inclined section 12 is comprised of a frame 20 having horizontally disposed members 22, vertically disposed members 24 and an inclined member 26. The inclined section 12 has an angular adjustment mechanism 28 which is adjusted to vary the angle of inclination of a conveyor 30 which supports a conveyor belt (not illustrated) for transporting the flexible packages 11 up an incline to the testing station 14. The horizontally disposed input section 32 is in line with a packaging line (not illustrated) which seals the flexible packages 11. The conveyor 30 delivers the packages 11 to a discharge section 36 on the same plane as the testing station 14 where testing of seal quality and height of the flexible packages is performed as described below. The inclined conveyor 12 functions to incrementally move the flexible packages 11 at a rate matching the incremental movement of the flexible packages through the test station 14 and the incremental movement by the reject conveyor 16. The incremental movement rate of the flexible packages through inclined section 12, testing station 14 and reject conveyor 16 is programmable with the controller 60 as described below. The incremental movement necessary to perform the testing operation, as discussed below in conjunction with FIGS. 5–8, is synchronized and controlled by the controller 60 in accordance with the control system illustrated in the block diagram of FIG. 2.

The conveyor 38, as illustrated in FIG. 4, includes a conveyor belt 39 which is supported by a rigid conveyor belt support frame 41 having upper and lower support surfaces 43 and 45 respectively so that the conveyor 38 does not flex during application of load to the flexible packages 11 during testing. As is described below, absolute position detection of the bottom surface of the pressure plate 54 during the sequence of the loading steps described in conjunction with FIGS. 5–8 is required to check seal integrity and height and for microleaks. A rigid conveyor belt support frame 41 immediately below the pressure plate 54 permits the sensed displacement of the digital stepping motor to be used as a direct measurement of absolute position.

The conveyor 38 accepts the flexible packages 11 from the output section 36 of the inclined section 12 and sequentially and incrementally conveys them past the testing mechanism 40 for testing seal quality and height as described below in conjunction with FIGS. 5–8. The conveyor 38 has an output 41 from which the tested flexible packages 11 are discharged to the reject conveyor 16.

The testing station 14 includes a support frame 42 which is comprised of vertical members 44 and horizontal members 46 and a control 47 contained in enclosure housing 48. An operator interface 50, which may be a Model 1100 Intelligent Operator Interface, manufactured by Eason Technology, is provided for controlling and programming the operation of the embodiment 10. A load cell 52, which preferably is a capacitive strain gauge manufactured by Rice Lake Corporation, is mounted on a movable loading device 54 in the form of a pressure plate which is indexed vertically under the control of a linear actuator 56 or other translation mechanism under control of a prime mover which, without limitation, is stepper/servo motor 58. The stepper/servo motor 58 has extremely high resolution which in a preferred application has 52,000 steps per revolution. This resolution in combination with the linear actuator 56 in a preferred application provides a feedback of 1,111.1 steps per millimeter which permits an extremely highly accurate calculation of the absolute position of the pressure plate 54 beginning at the time of initial contact with the flexible packages 11 and further during compression of the flexible packages as described below. The linear actuator 56 may be of differing constructions but one type of linear actuator which may be used with the present invention is an Axidyne Screw-Drive Actuator manufactured by Tol-O-Matic and described in U.S. Pat. No. 4,545,290. While different types of prime movers may be used, a preferred type is without limitation the E series hybrid NEMA42 frame size stepper motor identified by one of part numbers E41HCHT-LNK-NS-00, E42HCHT-LNK-NS-00 and 43HCHT-LNK-NS-00. An S-Drive manufactured by Compumotor Division of Parker Hannifin Corporation, and a Model 6200 Indexer manufactured by Compumotor Division, Parker Hannifin Corporation which are respectively identified by part numbers p/n 88-011483-01F and p/n 88-013168-01C are used to control the aforementioned type of stepper motor in a preferred application of the invention.

The program modules of the Appendix are in part Used to control the aforementioned stepper motor and associated electronics and to control indexing of the conveyor 38 and reject conveyor 16, processing of data read by the load cell 52 and numerous other control functions which are not necessary for understanding or practicing the present invention.

The overall function of the testing station 14 is to place the flexible packages 11 which are being tested for seal quality and height under load by vertically moving downward the pressure plate 54 under the drive from the linear actuator 56. The linear actuator 56 is powered by the stepper/servo motor 58 to place the packages under a sequence of at least two compressions as described below to test for the seal integrity of the flexible packages and further whether the height of the packages is between acceptable minimum and maximum height limits which facilitate packing by the auto case packer 18 as described below.

Figure 2:
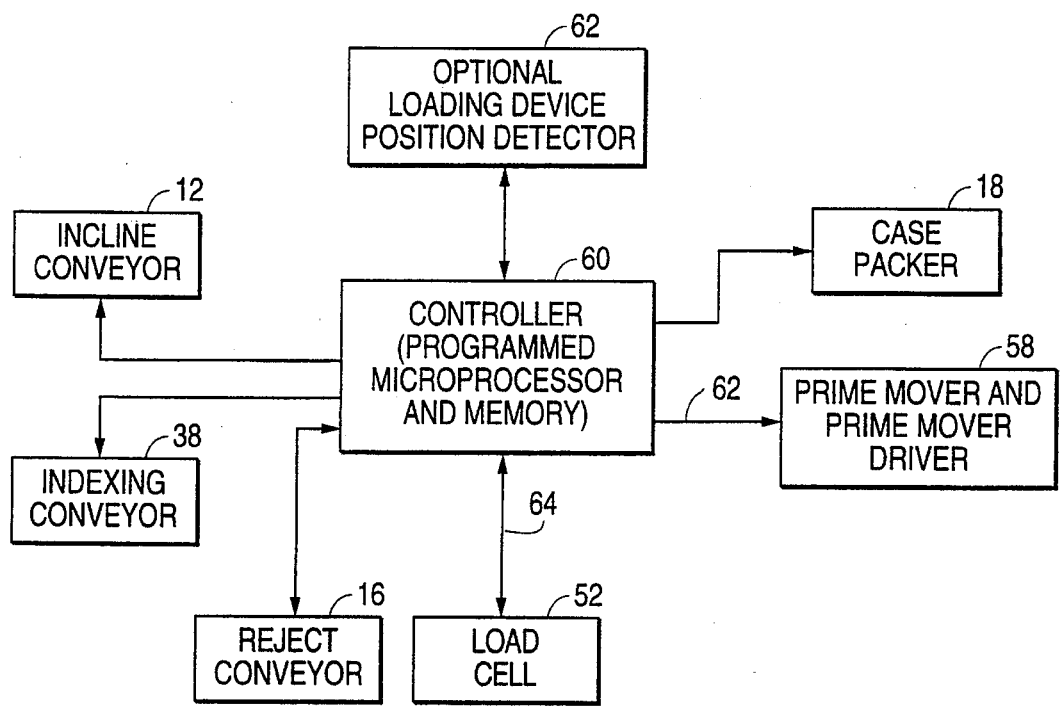
FIG. 2 is a block diagram of a control system which may be used to control the embodiment of FIG. 1.

FIG. 2 illustrates a block diagram of the control 47 of the embodiment of FIG. 1. The control 47 includes a controller 60 which is preferably a programmed microprocessor which controls the various elements of the system using the program modules contained in the Appendix. However, it should be understood that the present invention is not limited to the control 47 of the block diagram of FIG. 2 and to the program modules of the Appendix. Like reference numerals identify like numbers in FIGS. 1 and 2. In a preferred embodiment of the present invention, the controller 60 provides drive pulses on line 62 to the prime mover and primer mover driver 58 which supplies rotary power to the linear actuator 56. The advantage of using a digital stepper motor is that the controller 60 is programmed to count the number of pulses supplied on line 62 to the prime mover and the prime mover driver 58 which provides the absolute position of the bottom of the pressure plate 54 during contact with the flexible package 11 disposed on top of the testing section conveyor 39. The determination of the absolute position of the pressure plate 54 during the various processing steps of the pressure plate in loading the flexible packages is described below. The load cell 52 which, as stated above, preferably is a strain gauge, functions to provide feedback of sensed load to the controller 60 over line 64 which is required to test flexible packages 11. The use of the sensed load produced by the load cell 52 is described in detail below. The reject conveyor 16 is controlled by the controller 60. When either the height adjustment measured by the controller 60 is outside of a range defining an acceptable thickness or the load cell 52 fails to reach the set load, the flexible package should be rejected. The reject conveyor 16 may be of conventional design using a solenoid (not illustrated) controlling the source of compressed air 17 to blow air orthogonally out of the plane of FIG. 1 adjacent to the conveyor belt of the reject conveyor. Furthermore, the controller 60 functions to control the activation of the inclined conveyor 12 and the indexing conveyor 38 so that the flexible packages 11 are incrementally conveyed sequentially from the horizontally disposed input section 32 up the inclined conveyor 12 through the testing station 14 where they are sequentially contacted by the pressure plate 54 when the conveyor belt 39 is stopped using the loading sequences described in FIGS. 5–8 described below as sensed by the load cell 52. Additionally, an optional loading device position detector 62 provides feedback of an absolute position signal to the controller 60 which may be provided for sensing the absolute vertical position of the pressure plate 54 if the preferred control of the prime mover and prime mover driver 58 in the form of a digital stepping motor and the programmed microprocessor 60 is not used to determine the position of the pressure plate 54 by counting the number of control pulses applied on line 62. The optional loading device position detector 62 may be implemented by any suitable position servo mechanism which detects the position of the pressure plate 54 and feeds it back to the controller 60 for determination of absolute position. Furthermore, other known position detecting devices may be used as the optional loading device position detector 62 when the preferred embodiment of the prime mover and prime mover driver 58 in the form a digital stepping motor is not used which does not require position feedback information produced by the optional loading device position detector.

The modules of the Appendix which are executed by the controller 60 are summarized with reference to pages 1–50 of the Appendix as follows:

Pages 1–31

A. Sets screen date for Operator Interface Terminal
B. Sets input and output functions on Operator Interface Terminal
C. Sets level program input screens
D. Supplies data management screens
E. Sets calibration data parameters
F. Provides operation feedback
G. Establishes communication between operator and controller
H. Provides program storage and retrieval buffers Pages 32 and 33

A. Calibrates load cell
B. Sets zero point
C. Sets span point
D. Sets off-set stop Pages 34

A. Sets the soft stop bit for kill interrupt
B. Prevents processor lock-up

Pages 35–37

A. Sets all of the base variables for a standard program
B. Basic program levels are entered from Operational Interface Terminal to driver Page 38

A. Sets the span and force for the load cell and allows load cell communication

Pages 39 and 40

A. Power-up default program for stepper drive
B. Loads all operation parameters for the stepper system
C. Initialize outputs Pages 41–49

A. Sets all operations for 2 stepper axis
B. Initializes all inputs and outputs
C. Sets load cell input
D. Calculates time, force and distance
E. Performs all math functions
F. Provides outputs specific to the application
G. Outputs text to Operator Interface Terminal Page 50

A. Sets zero calibration mode for the load cell

Figure 3:
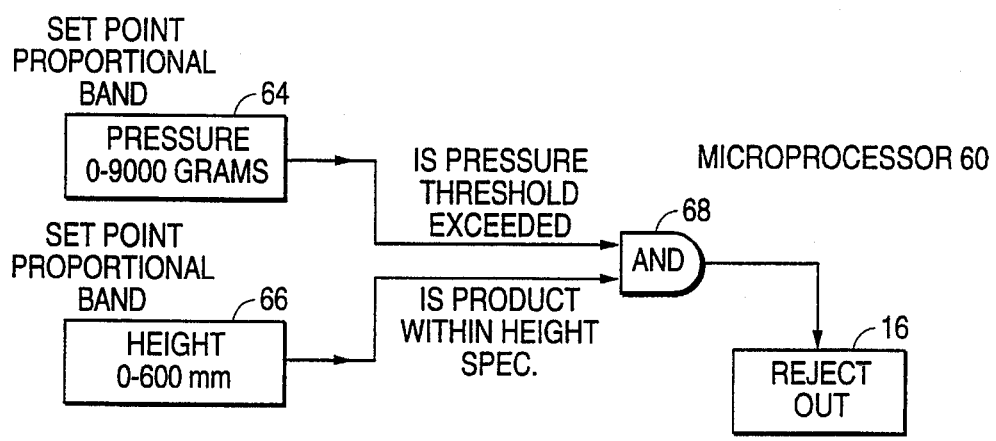
FIG. 3 is a diagram illustrating the setting and testing of flexible packages with programmable set loads and a set flexible package height range.

Controller 60 is programmable through information inputted from the operator interface 50 to set two control parameters, as illustrated in FIG. 3, which are the set load and the height specification range. The set load is applied and sensed to normalize test results and in a preferred embodiment of the invention is used for processing flexible packages used for foodstuffs, etc. between a set range of 0 and 9000 grams. The acceptable minimum and maximum height of the flexible packages 11 without limitation may be set in a preferred embodiment between 0 and 600 millimeters. In FIG. 3, the block 64, represents the setting of the range (proportional band) of the pressure to be sensed by the load cell 52 from 0 to 9000 grams and the block 66 represents the setting of the of the height range (proportional band) specifying the minimum and maximum heights of the package between 0 and 600 millimeters. It should be understood that the ranges of the set load and the set height are not in any way a limitation of the present invention and are only exemplary of ranges which may be used in a commercial embodiment of the present invention. As is illustrated, the controller 60 functions as a AND gate 68 to reject the flexible packages 11 when either the pressure threshold set by the pressure setting function 64 is not exceeded or the height specification set by the height setting function 66 has been exceeded. In this situation, the ANDing function performed by the AND gate 68 activates the air source 17 of the reject conveyor 16, to blow the flexible package 11 off the rigid conveyor when either or both of the set ranges for pressure and height are not achieved as described below.

Figure 5:
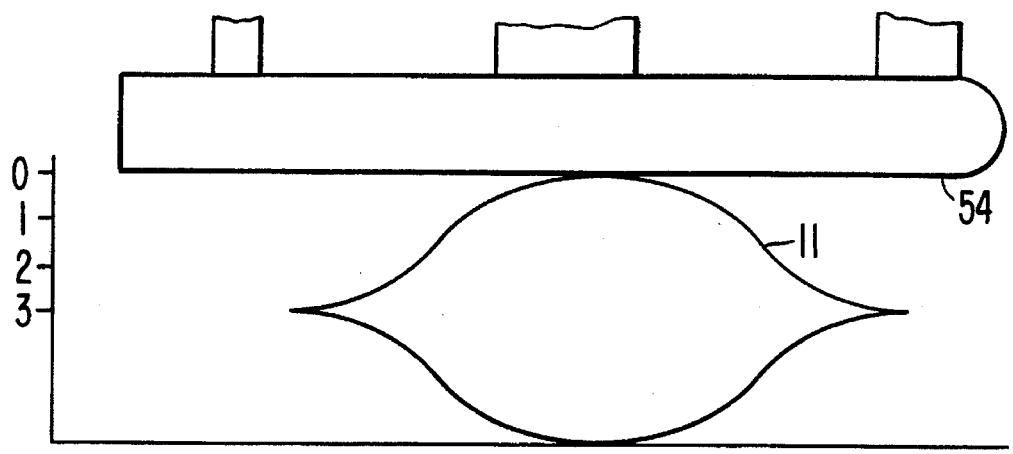
FIGS. 5–8 illustrate a sequence of loading steps applied to a flexible package during testing for seal quality and compliance with height specifications.
Figure 6:
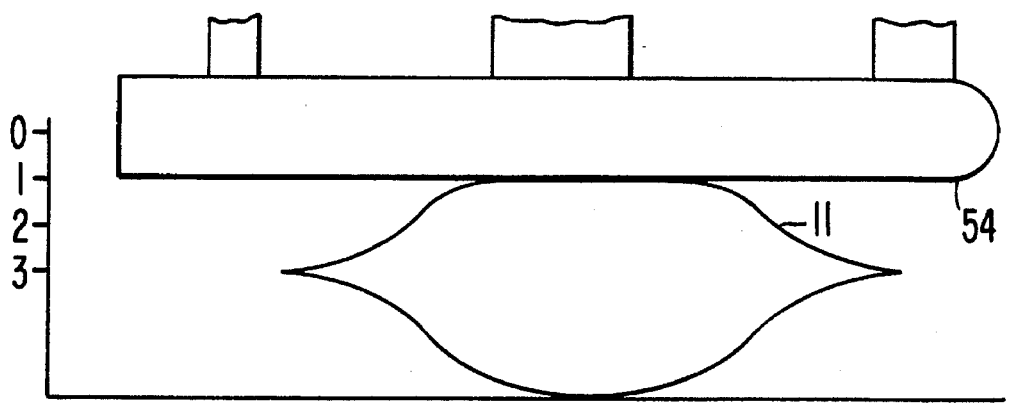

The present invention performs a process for testing seal quality and height of flexible packages, as illustrated in FIG. 4, as described in conjunction with FIGS. 5–8 as follows. The first step, as illustrated in FIG. 5, is to position the flexible package 11 to be tested at the test station 14 underneath the horizontal surface of the pressure plate 54. Thereafter, the linear actuator 56 initially moves the pressure plate vertically downward into contact with the flexible package. At the point of initial contact between the pressure plate 54 and the flexible package, the load cell 52 starts to feed back a sensed pressure which signals the controller 60 that the loading sequence has begun. As vertically downward movement of the pressure plate 54 continues, an increasing load is applied to the fluid within the flexible package 11 is sensed with the load cell 52. After initial contact of the pressure plate 54 with the flexible package 11, the pressure plate is moved an initial distance by the actuator 56 in the direction which causes the sensed load sensed by the load cell 52 to equal the set load which is set within the range set by the programmable loading function 64. This position is illustrated in FIG. 6. At that time, the controller 60 sets as a reference position of the pressure plate 54 the actual sensed position of the loading device when the set load set by the programmable loading function 64 is sensed by the load cell 52. The reference position is determined by the embodiment of the invention illustrated in FIG. 1 by the microprocessor within the controller 60 setting a counter equal to 0 when the set load is first sensed by the load cell 52. When the load cell 52 initially senses that the set load is reached, the linear actuator 56 is stopped by the controller 60 by removing power from the stepping motor 58, which drives the linear actuator, for a time interval sufficient to permit the package to expand elastically at the test station 14 which drops the load sensed by the sensing device below the set load.

The stopping of the pressure plate 54 for a short time interval at the position illustrated in FIG. 5 is an important part of the testing sequence of the present invention for the reason that the fold lines, and pleats, etc. in the end seals of the flexible packages 11 have an elastic quality which must be relaxed by a loaded expansion over a short time interval in order to achieve optimum test results from the subsequent loading step where seal integrity and compliance with flexible package specifications is reliably checked. In essence, the stopping of the pressure plate at the position of FIG. 5 normalizes the results achieved by the subsequent loading sequence of FIG. 7. A suitable time interval which is sufficient to permit the package to expand may be as short as 250 microseconds if the present invention is used in the production line embodiment as illustrated in FIG. 1. A finite period of time of stopping the pressure plate 54 produces sufficient expansion of the flexible packages 11 so that package dimensions are stable enough after expansion to permit the measurement of the height of the package to signify with reliable accuracy that the package is within an acceptable minimum and maximum height of the package which is necessary to properly use an automatic case packing machine such as the auto case packer 18. After the vertical downward movement of the pressure plate 54 is stopped, as illustrated in FIG. 6, the output load sensed by the load cell 52 drops below the set load.

Figure 7:
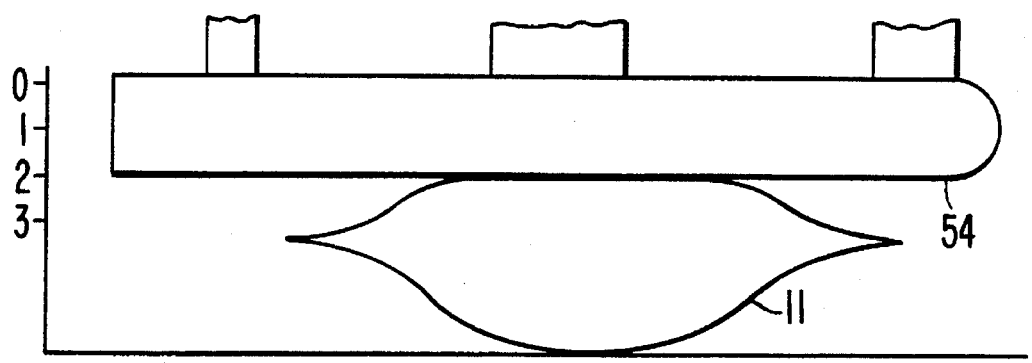
Figure 8:
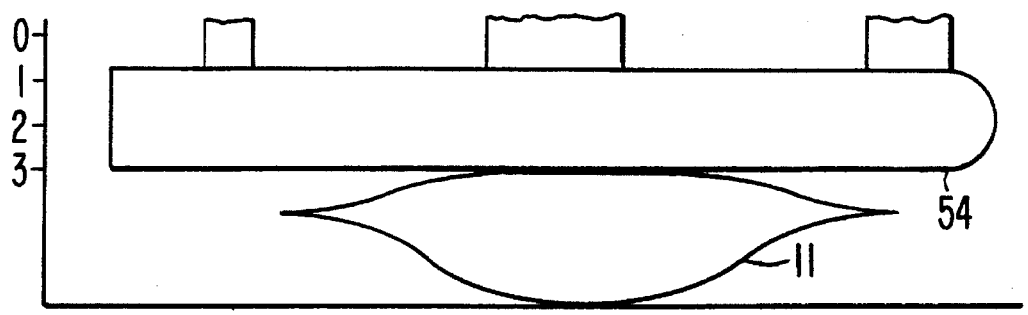

Thereafter, the pressure plate 54 is moved vertically downward an additional set distance from the reference position until either the load sensed by the load cell 54 again exceeds the set load, as illustrated in FIG. 7, at which point the displacement of the pressure plate 54 from the reference position illustrated in FIG. 5 to the vertical position at which the load cell 52 again signals that the set load has been achieved is measured or that the pressure plate has moved a maximum vertically downward distance without the load cell 52 signalling that the set load has again been reached as illustrated in FIG. 8. Failure to reach the set load after moving the maximum vertically downward distance, as illustrated in FIG. 8, indicates that the flexible package 11 is unacceptable because there is a leak in its seals or the faces. Furthermore, once the set load is sensed by the load cell 52 in the position illustrated in FIG. 7, the measured displacement from the reference position is compared to the acceptable range of the minimum and maximum height to determine whether or not the height of the package is suitable for automatic case packing machine 18.

The controller functions to store in memory that the package is acceptable when the movement of the pressure plate 54 the additional distance from the reference position, as illustrated in FIG. 7, causes the load sensed by the load cell 52 to at least equal the set load and the additional distance of movement from the reference position falls within a set range defining an acceptable minimum and maximum height of the package. The storing in memory that the package is acceptable blocks the activation of the air source 17 which would reject the flexible package from the reject conveyor 16. Furthermore, the controller 60 stores in memory that the package is rejected if the movement of the pressure plate 54 from the reference position the additional distance, as illustrated in FIG. 8, does not cause the sensed load to at least equal the set load or if the sensed load at least equals the set load and the movement of the loading device the additional distance from the reference position does not fall within the range defining the acceptable minimum and maximum height of the package as set by the height setting function 66.

The storage of test status in the memory of the controller as either an accepted or rejected flexible package is used to control the reject conveyor 16 in the conventional fashion to blow off by the activation of an air source 17 all rejected packages once they have moved from the testing station 14 to be adjacent the air source associated with the reject conveyor 16 and to pass all acceptable packages to the case packer 18.

The aforementioned process is repeated for each package as it is conveyed by the inclined section 12 conveyor and the testing section conveyor 38 to be positioned below the pressure plate 54 and loaded in the aforementioned sequence of loading steps.

The set load and the minimum and maximum height and the additional distance that the pressure plate 54 may move in testing the integrity of the seal of the package is programmable into the controller 60 by the use of the operator interface 50.

Preferably, the flexible packages 11 are provided to the horizontally disposed input section 32 from a packaging machine which may be any conventional packaging machine for packaging diverse products contained in flexible packages, such as, but not limited to, the package types identified above.

The set height range specified by the height setting function 66 may be determined by testing a plurality of packages with a set load and determining the additional distance of movement of the loading device 54 at which the set load is sensed to have been reached by the sensing device 52. The set range is set as a function of the determined additional distance with the average of the predetermined additional distance of each of the tested plurality of flexible packages 11 when the set load is achieved being the preferred relationship for determining what the specified average height should be. Thereafter, the deviation from the average may be set on both the high and the low end as indicated by the height setting function 66 by use of the operator interface 50. A module in the Appendix contains programming for implementing the aforementioned automatic function for setting average flexible package height.

The apparatus of FIGS. 1 and 4 may be used to test for microleaks by positioning individual flexible packages 11 under load testing applied by the pressure plate 54 for a testing interval such as 10 seconds per package in the following manner. Flexible packages 11 which are tested for microleaks may be an entire case of packages in order to test for the integrity of the material being used. The testing objective is to determine if any of the packages contain defects in the overall packaging material other than the seal integrity which has already been checked previously by the above-described process. The primary difference between the process for testing for microleaks and the process described above where the seal quality and height of flexible packages is determined is that the testing for microleaks alone requires a much longer loading condition to be applied to the packages after they are initially loaded with the set load to expand them elastically. Preferably, more than one loading step should be applied to the packages followed by the application of an increasing load over a longer time period, such as 10 seconds, in order to insure that the packages are completely elastically expanded prior to determining reliably that there are or are not any microleaks in the packaging material.

Specifically, the microleak detection process is described as follows. The process is identical to the previous process for testing seal quality and height up to the point at which the pressure plate 54 is stopped when the set load has been sensed by the load cell 52 for a time interval sufficient to permit the package to expand at the test station 14 which drops the load sensed by the load cell below the set load as illustrated in FIG. 5. Thereafter, the pressure plate 54 is moved in the direction that causes an increase in load an additional distance over a testing time interval which may be, but is not limited to, an interval such as 10 seconds while sensing the load on the package with the load cell 52 to expel fluid from the package during the testing time interval if leaks are present. The flexible package 11 is rejected after completion of moving the pressure plate 54 the additional distance if the load cell 52 detects a drop in the load sensed over the testing time interval and accepts the package if the sensing device does not detect a drop in the load sensed over the testing time interval. Further, the process may be improved by adding the additional steps of stopping movement of the pressure plate 54 after moving the pressure plate the additional distance for another time interval sufficient to permit the flexible package 11 to expand if the package is not fully expanded followed by moving the loading device in the direction which causes increasing loading another additional distance over another testing time interval, such as 10 seconds, to expel fluid from the flexible package during the another testing time interval if leaks are present in the package and rejecting the flexible package after completion of moving the pressure plate the another additional distance if the load cell 52 detects a drop in the load sensed over the another testing time interval and accepts the flexible package if the sensing device does not detect the drop in the load sensed over the another testing time interval. The aforementioned steps of stopping movement of the pressure plate, moving the pressure plate and rejecting the flexible package or accepting the flexible package may be repeated.

The controller 60, as stated above, preferably is a programmed microprocessor. The controller is electrically coupled to the load cell 52, the digital stepping motor 58 and the conveyors 12, 16 and 38 for determining a position of the pressure plate 54, for monitoring the sensed load, for controlling operation of the conveyors and application of power to the prime mover 58, for controlling an application of power to the prime mover to provide power to the actuator 56 to cause movement of the pressure plate in the direction which increases load so that the pressure plate is initially moved into contact with the flexible package 11 to apply an increasing load to a fluid within the package until the controller 60 receives from the load cell an electrical signal representing that the sensed load equals a set load set by the load 64 setting function, for defining a reference position of the pressure plate when the set load is sensed to have been reached, for causing movement of the pressure plate to stop when the set load has been sensed by the load cell for a time interval sufficient to permit the flexible packages to expand at the test station 14 which drops the sensed load below the set load, for causing the pressure plate to be moved a distance from the reference position in the direction for causing the package to be moved from the test station 16 by the conveyor 38 as an acceptable package if the movement of the pressure plate from the reference position causes the load sensed by the load cell to at least equal the set load and the distance of movement from the reference position falls within a set range determined by the height setting function 66 defining an acceptable minimum and maximum height of the flexible package, and for causing the flexible package to be moved from the test station as a rejected package if the movement the distance from the reference position does not cause the sensed load to at least equal the set load or if the sensed load at least equals the set load and the movement of the pressure plate the distance from the reference position does not fall within the range defining the acceptable minimum and maximum height.

Figure 9:
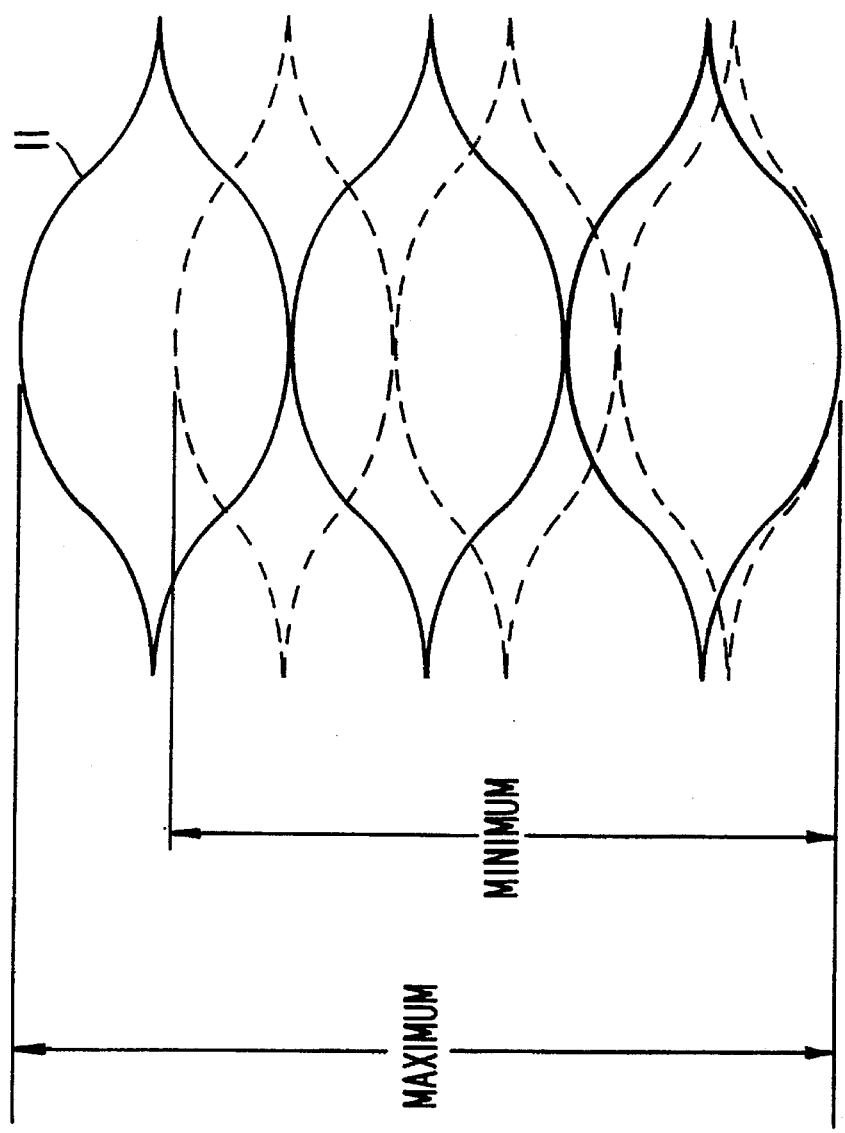
FIG. 9 illustrates a required range between a minimum and a maximum height of a stack of flexible packages to facilitate use of a case packing machine of conventional construction as illustrated in the embodiment of FIG. 1.

The case packing machine 18 is in line with the reject conveyor 16 for packing accepted packages in a predetermined configuration into cases with the height of a plurality of the accepted packages in the stacked packing configuration falling within a permissible range of height of the stacked packing configuration between a minimum and a maximum for which the case packing machine operates without packing error. An example of a stacked packing configuration of multiple flexible packages, after testing as described above in conjunction with FIGS. 5–8, is illustrated in FIG. 9. The legends in FIG. 9 show in an exaggerated form "minimum" and "maximum" cumulative heights which are permissible with an auto case packing machine 18 when all of the packages individually fall with the minimum and maximum height limits tested by the sequence of FIGS. 5–7. The individual testing of flexible packages prevents a cumulative thickness exceeding the minimum and maximum height of FIG. 9 which could interfere with or prevent automated case packing with the auto case packer 18.

As has been stated above, in a preferred embodiment of the invention, controller 60 implements the height setting function 66 by controlling testing of a plurality of packages with the set load, determines the additional distance of movement of the load cell 52 at which the set load is sensed to have been reached and sets the set range as a function of the determined distance which preferably is the average. Thereafter, acceptable deviations from the average both on the high and load side are set by an operator using the operator interface 50.

While the present invention has been described in terms of preferred embodiments, it should be understood that numerous modifications may be made to the present invention without departing from the spirit and scope of the present invention. It is intended that all such modifications fall within the scope of the appended claims.

APPENDIX

An Appendix containing program modules consisting of 50 pages is attached hereto, The modules are written in the C programming language. The modules are used to implement the programmed controller 60 of the present invention and to control the conveyors and stepping motor and to calculate the average height of the flexible packages as described in the specification. A detailed explanation of the modules is set forth below. The Appendix contains subject matter which is copyrighted. A limited license is granted to anyone who requires a copy of the program disclosed therein for purposes of understanding or analyzing the invention, but no license is granted to make a copy for any other purpose including the loading of a processing device with code in any form or language.

```
- GOTO SCREEN begin
*>SCREEN begin
- COMMENT "THE PROGRAM NAME IS    TEGRA-1F.BLD    UPDATED 09-12-94"
  POWER RESUME ON
- COMMENT "TEMPORARY CODE FOR INITIALIZATION"
  REM NVOL&(99) = 0

CALL SETNVOL$(0)
  HH = 100
  BAGTOWT&=20
  TIMO = 250
  CALL BACKLIGHT (1)
  CALL LOWBITS (1)
- GOSUB LABEL st
- GOSUB LABEL screem
- HOT KEY (9) "MSTOP" INTERRUPT: GOSUB LABEL mstop
  IF NVOL&(99)=12345 THEN GOTO contnvol
  NVOL&(2)  = 0
  NVOL&(3)  = 0
  NVOL&(5)  = 75
  NVOL&(6)  = 65
  NVOL&(7)  = 26
  NVOL&(8)  = 2000
  NVOL&(9)  = 25
  NVOL&(10) = 2000
  NVOL&(11) = 4
  NVOL&(12) = 0
  NVOL&(13) = 0
  NVOL&(20) = 96
  NVOL&(21) = 8
  NVOL&(22) = 1
  NVOL&(23) = 0
  NVOL&(24) = 1
  NVOL&(25) = 1
  NVOL&(26) = 250
  NVOL&(27) = 1
  NVOL&(28) = 1
  NVOL&(50) = 500
  NVOL&(99) = 12345
  NVOL$(1) = "ACCUPAK"
  NVOL$(2) = "SUPV"
  NVOL$(3) = "MAINT"
  NVOL$(4) = "OPER1"
  NVOL$(5) = "OPER2"
  NVOL$(6) = "2122"
  REM ARRAY NVOL&(100,500)    FOR HISTORY
  FOR R=100 TO 500
    NVOL&(R) = 0
  PRINT"REGISTER #";R
  NEXT R
- LABEL contnvol
  LOWCNT&=NVOL&(2)
```

```
            HICNT&=NVOL&(3)
            HILVL=NVOL&(5)
            LOLVL=NVOL&(6)
            CALVAL=NVOL&(7)
            LEAKCNT&=NVOL&(8)
            LEAKTIME&=NVOL&(9)
            bagtolek&=NVOL&(10)
            badbag&=NVOL&(11)
            bagtowt&=NVOL&(12)
            ipptr = NVOL&(13)
            bau = NVOL&(20)
            databi = NVOL&(21)
            stopbi = NVOL&(22)
            parit = NVOL&(23)
            hand = NVOL&(24)
            stri = NVOL&(25)
            timo = NVOL&(26)
            PR1 = NVOL&(27)
            FPR2 = NVOL&(28)
            DLIM& = NVOL&(50)
            MASTERPASS$ = NVOL$(1)
            SUPERPASS$ = NVOL$(2)
            MAINTPASS$ = NVOL$(3)
            OPER1PASS$ = NVOL$(4)
            OPER2PASS$ = NVOL$(5)
            PRGPASS$ = NVOL$(6)
            hilvl$ = STR$(hilvl)
            lolvl$ = STR$(lolvl)
            CONFIG #1,BAU,DATABI,STOPBI,PARIT,HAND,STRI,TIMO
            CONFIG #2,96,8,1,0,1,1,250
        - GOTO SCREEN oper1
        *>SCREEN oper1
        - PUT TEXT AT (2,4): "F1: SECURITY         F2: MAINTENANCE"
        - PUT TEXT AT (2,5): "F3: OPER.DATA        F4: START INTEGRA"
        - PUT TEXT AT (2,6): "F5: TEST FIVE BAGS F6: COMMUNICATION"
        - PUT TEXT AT (2,7): "F7: SET TIME         F9: STOP INTEGRA"
        - PUT REVERSE TEXT AT (2,4): "F1"
        - PUT REVERSE TEXT AT (21,4): "F2"
        - PUT REVERSE TEXT AT (2,5): "F3"
        - PUT REVERSE TEXT AT (21,5): "F4"
        - PUT REVERSE TEXT AT (2,6): "F5"
        - PUT REVERSE TEXT AT (21,6): "F6"
        - PUT REVERSE TEXT AT (2,7): "F7"
        - PUT REVERSE TEXT AT (21,7): "F9"
        - PUT LARGE TEXT AT (6,1): "MAIN MENU"
        - SOFTKEY (1) "SECUR" GOTO SCREEN secur
        - SOFTKEY (2) "MAINT" GOTO SCREEN maint1
        - SOFTKEY (3) "DATA" GOTO SCREEN dataa
        - SOFTKEY (4) "RUN" GOTO SCREEN redox
        - SOFTKEY (5) "TEST" GOTO SCREEN test
        - SOFTKEY (6) "COMM" GOTO SCREEN coom
        - SOFTKEY (7) "TIME" GOTO SCREEN tmm
```

```
- SOFTKEY (8) "ABOUT" GOTO SCREEN about
- LABEL repp7
- SOFTKEY CHECK
- GOSUB LABEL tme
- GOTO LABEL repp7
- LABEL tme
  POS 13,3
  PRINT TIME$(2);
  CALL CURSOR (0)
- RETURN
*>SCREEN about
- PUT LARGE TEXT AT (4,1): "ACCU-PAK INC!"
- PUT TEXT AT (4,4): "2122 COUNTRY CLUB DRIVE SUITE 180"
- PUT TEXT AT (9,5): "CARROLLTON TEXAS 75006"
- PUT TEXT AT (11,6): "TEL.(214)-416-4115"
- PUT TEXT AT (11,7): "FAX.(214)-416-4047"
- SOFTKEY (1) "-OK-" GOTO SCREEN oper1
- SOFTKEY (2) "EXIT" GOTO SCREEN ex
  CALL CURSOR (0)
- LABEL repp8
- GOSUB LABEL tme
- SOFTKEY CHECK
- GOTO LABEL repp8
- LABEL ex
- GOSUB LABEL pccheck
  IF TTEMPASS$ = SUPERPASS$ THEN GOTO EXIT
  IF TTEMPASS$ = MASTERPASS$ THEN GOTO EXIT
  IF TTEMPASS$ = MAINTPASS$ THEN GOTO EXIT
  IF TTEMPASS$ = NVOL$(6) THEN GOTO EXIT
- GOTO SCREEN about
*>SCREEN tmm
- PUT TEXT AT (14,2): "SET TIME..."
- PUT TEXT AT (2,4): "PLEASE ENTER HOURS (0-23)..."
- GET STRING hh$ AT (31,4) DEFAULT "12"
  IF val(HH$) < 0 THEN GOTO tmm
  IF val(HH$) > 23 THEN GOTO tmm
- LABEL hr
- PUT TEXT AT (2,4): "PLEASE ENTER MINUTES (0-59)...  "
- GET STRING mm$ AT (33,4) DEFAULT "59"
  IF VAL(MM$) >59 THEN GOTO hr
  IF val(MM$) < 0 THEN GOTO hr
- PUT TEXT AT (2,4): "PLEASE ENTER SECONDS (0-59)...  "
- GET STRING ss$ AT (33,4) DEFAULT "59"
  IF val(SS$) < 0 THEN SS$ ="0"
  IF val(ss$) > 59 THEN SS$ =" 0"
  TITLE$ = "CHANGE TIME"
- GOSUB LABEL popup
  IF ACC = 1 THEN TIME$ = HH$ + ":" + MM$ + ":" + SS$
- GOTO SCREEN oper1
*>SCREEN coom
  IF PR2 = 0 THEN GOTO ferr
  tttitle$ = "COMMUNICATIONS MENU"
```

```
- GOSUB LABEL pccheck
  IF TTEMPASS$ = SUPERPASS$ THEN GOTO ferr
  IF TTEMPASS$ = MASTERPASS$ THEN GOTO ferr
  IF TTEMPASS$ = NVOL$(6) THEN GOTO ferr
- GOTO SCREEN oper1
- LABEL ferr
- CLEAR GRAPHICS SCREEN
- CLEAR SCREEN
- PUT LARGE TEXT AT (4,1): "COMMUNICATION"
- PUT TEXT AT (2,4): "F1: LINE SETTING  F2: TOGGLE COMM."
- PUT TEXT AT (2,5): "F3: SET TO DEFAULT"
- PUT REVERSE TEXT AT (2,4): "F1"
- PUT REVERSE TEXT AT (20,4): "F2"
- PUT REVERSE TEXT AT (2,5): "F3"
- SOFTKEY (1) "LINE" GOTO SCREEN des
- SOFTKEY (2) "COMM" GOTO SCREEN comon
- SOFTKEY (3) "-DEF-" GOTO SCREEN deff
- SOFTKEY (7) "" GOTO SCREEN oper1
- LABEL repp9
  CALL CURSOR (0)
- GOSUB LABEL tme
- SOFTKEY CHECK
- GOTO LABEL repp9
*>SCREEN comon
  IF iPPTR = 1 THEN GOTO ilook
  if pr2 = 0 then goto ilddata
  tttitle$ = "TURN COMM PORT ON"
- GOSUB LABEL pccheck
  IF TTEMPASS$ = SUPERPASS$ THEN GOTO ilddata
  IF TTEMPASS$ = MASTERPASS$ THEN GOTO ilddata
  IF TTEMPASS$ = NVOL$(6) THEN GOTO ilddata
  GOTO ferr
- LABEL ilddata
  TITLE$ = "TURN COMM PORT ON"
- CLEAR SCREEN
  if pr1 = 1 then gosub popup
  if pr1 = 0 then acc = 1
  IF ACC = 0 THEN GOTO leason
- PUT LARGE TEXT AT (4,3): "COMM PORT ON!"
  iPPTR = 1:nvol&(13) = ipptr
- DELAY 300
- GOTO SCREEN leason
- LABEL ilook
  if pr2 = 0 then goto illook
  tttitle$ = "TURN COMM PORT OFF"
- GOSUB LABEL pccheck
  IF TTEMPASS$ = SUPERPASS$ THEN GOTO illook
  IF TTEMPASS$ = MASTERPASS$ THEN GOTO illook
  IF TTEMPASS$ = NVOL$(6) THEN GOTO illook
  GOTO ferr
- LABEL illook
  title$ = "TURN COMM PORT OFF"
```

```
- CLEAR SCREEN
  if pr1 = 1 then gosub popup
  if pr1 = 0 then acc = 1
  IF ACC = 0 THEN GOTO leason
- PUT LARGE TEXT AT (3,3): "COMM PORT OFF!"
  iPPTR = 0:nvol&(13) = ipptr
- DELAY 300
- GOTO SCREEN ferr
*>SCREEN deff
  CONFIG #1,96,8,1,0,0,0,250
  nvol&(20) = 96
  nvol&(21) = 8
  nvol&(22) = 1
  nvol&(23) = 0
  nvol&(24) = 0
  nvol&(25) = 0
  nvol&(26) = 250
- GOTO SCREEN oper1
*>SCREEN des
- GOSUB LABEL timm
- SOFTKEY (1) "CHG." GOTO SCREEN fed
- SOFTKEY (2) " OK" GOTO SCREEN oper1
  CALL BOX (239,0,0,63,1)
  CALL CURSOR (0)
- SOFTKEY WAIT
*>SCREEN fed
- PUT TEXT AT (4,2): "CONFIGURE COMMUNICATIONS PORT # 1"
- PUT TEXT AT (11,3): "---BAUD RATE---"
- PUT TEXT AT (2,4): "F1: 300              F2: 600"
- PUT TEXT AT (2,5): "F3: 1200             F4: 2400"
- PUT TEXT AT (2,6): "F5: 4800             F6: 9600"
- PUT TEXT AT (2,7): "F7: EXIT TO MENU     F8: 19200"
- PUT REVERSE TEXT AT (2,4): "F1"
- PUT REVERSE TEXT AT (24,4): "F2"
- PUT REVERSE TEXT AT (2,5): "F3"
- PUT REVERSE TEXT AT (24,5): "F4"
- PUT REVERSE TEXT AT (2,6): "F5"
- PUT REVERSE TEXT AT (24,6): "F6"
- PUT REVERSE TEXT AT (2,7): "F7"
- PUT REVERSE TEXT AT (24,7): "F8"
- SOFTKEY (1) " 300" GOTO SCREEN b3
- SOFTKEY (2) " 600" GOTO SCREEN b6
- SOFTKEY (3) "1200" GOTO SCREEN b1
- SOFTKEY (4) "2400" GOTO SCREEN b2
- SOFTKEY (5) "4800" GOTO SCREEN b4
- SOFTKEY (6) "9600" GOTO SCREEN b9
- SOFTKEY (7) "" GOTO SCREEN oper1
- SOFTKEY (8) "" GOTO SCREEN b19
  CALL CURSOR (0)
- SOFTKEY WAIT
*>SCREEN b3
  BAU = 3
```

```
 - GOTO SCREEN datab
*>SCREEN b6
   BAU = 6
 - GOTO SCREEN datab
*>SCREEN b1
   BAU = 12
 - GOTO SCREEN datab
*>SCREEN b2
   BAU = 24
 - GOTO SCREEN datab
*>SCREEN b4
   BAU = 48
 - GOTO SCREEN datab
*>SCREEN b9
   BAU = 96
 - GOTO SCREEN datab
*>SCREEN b19
   BAU = 192
 - GOTO SCREEN datab
*>SCREEN datab
 - PUT TEXT AT (4,2): "CONFIGURE COMMUNICATIONS PORT # 1"
 - PUT TEXT AT (13,3): "---DATABITS---"
 - PUT TEXT AT (2,5): "F1: 7 DATABITS       F2: 8 DATABITS"
 - PUT REVERSE TEXT AT (2,5): "F1"
 - PUT REVERSE TEXT AT (24,5): "F2"
 - SOFTKEY (1) "7 BIT" GOTO SCREEN d7
 - SOFTKEY (2) "8 BIT" GOTO SCREEN d8
 - SOFTKEY (7) "" GOTO SCREEN oper1
   CALL CURSOR (0)
 - SOFTKEY WAIT
*>SCREEN d7
   DATABI = 7
 - GOTO SCREEN stopb
*>SCREEN d8
   DATABI = 8
 - GOTO SCREEN stopb
*>SCREEN stopb
   CALL CURSOR (0)
 - PUT TEXT AT (4,2): "CONFIGURE COMMUNICATIONS PORT # 1"
 - PUT TEXT AT (13,3): "---STOPBITS---"
 - PUT TEXT AT (2,5): "F1: 1 STOP BIT       F2: 2 STOP BITS"
 - PUT REVERSE TEXT AT (2,5): "F1"
 - PUT REVERSE TEXT AT (24,5): "F2"
 - SOFTKEY (1) "1 BIT" GOTO SCREEN s1
 - SOFTKEY (2) "2 BIT" GOTO SCREEN s2
 - SOFTKEY (7) "" GOTO SCREEN oper
   CALL BOX (239,0,0,63,1)
 - SOFTKEY WAIT
*>SCREEN s1
   STOPBI = 1
 - GOTO SCREEN par
*>SCREEN s2
```

```
   STOPBI = 2
-  GOTO SCREEN par
*>SCREEN par
-  PUT TEXT AT (4,2): "CONFIGURE COMMUNICATIONS PORT # 1"
-  PUT TEXT AT (13,3): "----PARITY---"
-  PUT TEXT AT (2,5): "F1: ODD PARITY       F2: EVEN PARITY"
-  PUT TEXT AT (2,6): "F3: NONE"
-  PUT REVERSE TEXT AT (2,5): "F1"
-  PUT REVERSE TEXT AT (24,5): "F2"
-  PUT REVERSE TEXT AT (2,6): "F3"
-  SOFTKEY (1) " ODD" GOTO SCREEN po
-  SOFTKEY (2) "EVEN" GOTO SCREEN pe
-  SOFTKEY (3) "NONE" GOTO SCREEN p0
-  SOFTKEY (7) "NONE" GOTO SCREEN oper1
   CALL CURSOR (0)
-  SOFTKEY WAIT
*>SCREEN po
   PARIT = 2
-  GOTO SCREEN hand
*>SCREEN pe
   PARIT = 1
-  GOTO SCREEN hand
*>SCREEN p0
   PARIT = 0
-  GOTO SCREEN hand
*>SCREEN hand
-  PUT TEXT AT (4,2): "CONFIGURE COMMUNICATIONS PORT # 1"
-  PUT TEXT AT (12,3): "---HANDSHAKE---"
-  PUT TEXT AT (2,5): "F1: YES           F2: NO"
-  PUT REVERSE TEXT AT (2,5): "F1"
-  PUT REVERSE TEXT AT (24,5): "F2"
-  SOFTKEY (1) "YES" GOTO SCREEN hy
-  SOFTKEY (2) " NO" GOTO SCREEN hn
-  SOFTKEY (7) "" GOTO SCREEN oper1
   CALL CURSOR (0)
-  SOFTKEY WAIT
*>SCREEN hy
   HAND = 1
-  GOTO SCREEN str
*>SCREEN hn
   HAND = 0
-  GOTO SCREEN str
*>SCREEN str
-  PUT TEXT AT (4,2): "CONFIGURE COMMUNICATIONS PORT # 1"
-  PUT TEXT AT (5,3): "---STRIP LINE FEED CHARACTERS---"
-  PUT TEXT AT (2,4): "F1: YES           F2: NO"
-  PUT REVERSE TEXT AT (2,4): "F1"
-  PUT REVERSE TEXT AT (23,4): "F2"
-  SOFTKEY (1) "YES" GOTO SCREEN sy
-  SOFTKEY (2) " NO" GOTO SCREEN sn
-  SOFTKEY (7) "" GOTO SCREEN oper1
   CALL CURSOR (0)
```

```
- SOFTKEY WAIT
*>SCREEN sy
  STRI = 1
- GOTO SCREEN tim
*>SCREEN sn
  STRI = 0
- GOTO SCREEN tim
*>SCREEN tim
  CALL CURSOR (0)
- PUT TEXT AT (4,2): "CONFIGURE COMMUNICATIONS PORT # 1"
- PUT TEXT AT (13,3): "---TIMEOUT---"
- PUT TEXT AT (4,5): "ENTER TIMEOUT IN MILLISECONDS...."
  CALL BOX (239,0,0,63,1)
- GET NUMBER timo AT (4,6) USING "#####" DEFAULT 250
- GOSUB LABEL timm
- SOFTKEY (1) "CHG" GOTO SCREEN fed
- SOFTKEY (2) "OK" GOTO SCREEN ccl
- SOFTKEY WAIT
- LABEL ccl
  CONFIG #1,BAU,DATABI,STOPBI,PARIT,HAND,STRI,TIMO
  nvol&(20) = bau
  nvol&(21) = databi
  nvol&(22) = stopbi
  nvol&(23) = parit
  nvol&(24) = hand
  nvol&(25) = stri
  nvol&(26) = timo
- GOTO LABEL oper1
*>SCREEN secur
  TTTITLE$ = "PASSWORD MENU"
- GOSUB LABEL pccheck
  IF TTEMPASS$ = MASTERPASS$ THEN GOTO fries
  IF TTEMPASS$ = SUPERPASS$ THEN GOTO fries
  IF TTEMPASS$ = NVOL$(6) THEN GOTO fries
- GOTO SCREEN oper1
- LABEL fries
- CLEAR GRAPHICS SCREEN
- CLEAR SCREEN
- PUT LARGE TEXT AT (4,1): "PASSWORD MENU"
- PUT TEXT AT (2,3): "F1: MASTER PASSWORD"
- PUT TEXT AT (2,4): "F2: SUPERVISOR PASSWORD"
- PUT TEXT AT (2,5): "F3: MAINTENANCE PASSWORD"
- PUT TEXT AT (2,6): "F4: OPERATOR 1 PASSWORD"
- PUT TEXT AT (2,7): "F5: OPERATOR 2 PASSWORD"
  POS 28,3
  PRINT MASTERPASS$
  POS 28,4:PRINT SUPERPASS$
  POS 28,5
  PRINT MAINTPASS$
  POS 28,6
  PRINT OPER1PASS$
  POS 28,7
```

```
  PRINT OPER2PASS$;
- PUT REVERSE TEXT AT (2,3): "F1"
- PUT REVERSE TEXT AT (2,4): "F2"
- PUT REVERSE TEXT AT (2,5): "F3"
- PUT REVERSE TEXT AT (2,6): "F4"
- PUT REVERSE TEXT AT (2,7): "F5"
- SOFTKEY (1) "MAST." GOTO SCREEN ssm
- SOFTKEY (2) "SUPR." GOTO SCREEN sss
- SOFTKEY (3) "MAINT" GOTO SCREEN sst
- SOFTKEY (4) "OPER1" GOTO SCREEN ssop1
- SOFTKEY (5) "OPER2" GOTO SCREEN ssop2
- SOFTKEY (6) "EXIT" GOTO SCREEN oper1
- SOFTKEY (7) "" GOTO SCREEN oper1
  CALL CURSOR (0)
- SOFTKEY WAIT
*>SCREEN dataa
  IF PR2 = 0 THEN GOTO ldataa
  TTTITLE$ = "OPERATIONAL DATA"
- GOSUB LABEL pccheck
  if ttempass$ = oper1pass$ then goto ldataa
  if ttempass$ = oper2pass$ then goto ldataa
  if ttempass$ = masterpass$ then goto ldataa
  IF TTEMPASS$ = SUPERPASS$ THEN GOTO ldataa
  IF TTEMPASS$ = NVOL$(6) THEN GOTO ldataa
- GOTO SCREEN oper1
- LABEL ldataa
- CLEAR GRAPHICS SCREEN
- CLEAR SCREEN
- PUT LARGE TEXT AT (3,1): "OPERATIONAL DATA"
- PUT TEXT AT (2,4): "F1:HI LIMIT"
- PUT TEXT AT (21,4): "F2:LO LIMIT"
- PUT NUMBER hilvl AT (14,4) USING "###.##"
- PUT NUMBER lolvl AT (34,4) USING "###.##"
- PUT TEXT AT (2,5): "F3:LEAK CNT"
- PUT TEXT AT (21,5): "F4:LEAK TIME"
- PUT NUMBER leaktime& AT (34,5) USING "####"
- PUT NUMBER leakcnt& AT (14,5) USING "######"
- PUT TEXT AT (2,7): "F7:RETURN TO MENU  F8:CLEAR COUNTERS  "
- PUT TEXT AT (2,6): "F5:                F6:RESET LEAK COUNT"
- PUT REVERSE TEXT AT (21,4): "F2"
- PUT REVERSE TEXT AT (2,5): "F3"
- PUT REVERSE TEXT AT (21,5): "F4"
- PUT REVERSE TEXT AT (2,6): "F5"
- PUT REVERSE TEXT AT (21,6): "F6"
- PUT REVERSE TEXT AT (2,7): "F7"
- PUT REVERSE TEXT AT (21,7): "F8"
- PUT REVERSE TEXT AT (2,4): "F1"
- SOFTKEY (1) "HI-LM" GOTO SCREEN hilm
- SOFTKEY (2) "LO-LM" GOTO SCREEN lolm
- SOFTKEY (3) "LK-CT" GOTO SCREEN lkct
- SOFTKEY (4) "LK-TM" GOTO SCREEN lktm
- SOFTKEY (5) " F5 " GOTO SCREEN ldataa
```

```
- SOFTKEY (6) "RESET" GOTO SCREEN ress
- SOFTKEY (8) "CLEAR" GOTO SCREEN clt
- SOFTKEY (7) "MENU" GOTO SCREEN operl
  CALL CURSOR (0)
- LABEL repp10
- GOSUB LABEL tme
- SOFTKEY CHECK
- GOTO LABEL repp10
*>SCREEN ress
  title$ = "RESET LEAK COUNTER"
  if pr1 = 1 then gosub popup
  if pr1 = 0 then acc = 1
  if acc = 0 then goto sub3
  if ACC = 1 THEN LEAKCNT& = NVOL&(8)
- LABEL sub3
- GOTO SCREEN ldataa
*>SCREEN hilm
  title$ = "CHANGE HIGH LIMIT"
- PUT TEXT AT (2,3): "ENTER NEW HIGH LIMIT(mms)"
  oldhilvl = hilvl
- GET NUMBER newhilvl AT (29,3) USING "###.#" DEFAULT hilvl
- GET newhilvl RANGE FROM 65 TO 120 OR GOTO errx1
  hilvl = newhilvl
  if pr1 = 1 then gosub popup
  if pr1 = 0 then acc = 1
  if acc = 0 then hilvl = oldhilvl
  IF ACC = 1 THEN GOSUB doit
- GOTO SCREEN ldataa
*>SCREEN lolm
  TITLE$ = "CHANGE LOWER LIMIT"
- PUT TEXT AT (3,7): "ENTER NEW LOW LIMIT (mms)"
  OLDLOLVL = LOLVL
- GET NUMBER newlolvl AT (29,7) USING "###.#" DEFAULT lolvl
- GET newlolvl RANGE FROM 65 TO 120 OR GOTO errx1
  IF (lolvl > hilvl) then goto errx2
  lolvl = newlolvl
  if pr1 = 1 then gosub popup
  if pr1 = 0 then acc = 1
  IF ACC = 0 THEN LOLVL = OLDLOLVL
  if ACC = 1 THEN GOSUB doit
- GOTO SCREEN ldataa
*>SCREEN lkct
  TITLE$ = "CHANGE LEAK COUNTER"
- PUT TEXT AT (2,7): "ENTER NEW VALUE FOR LEAK COUNTER"
  OLDLEAKCNT& = LEAKCNT&
- GET NUMBER leakcnt& AT (34,7) USING "######" DEFAULT 4
  NVOL&(8)=leakcnt&
  bagtolek& = leakcnt&
  NVOL&(10)=bagtolek&
  if pr1 = 1 then gosub popup
  if pr1 = 0 then acc = 1
  IF ACC = 0 THEN LEAKCNT& = OLDLEAKCNT&
```

```
- GOTO LABEL ldataa
*>SCREEN lktm
  TITLE$ = "CHANGE LEAK TIMER"
- PUT TEXT AT (2,7): "ENTER NEW TIME VALUE FOR TIMER"
  OLDLEAKTIME& = LEAKTIME&
- GET NUMBER leaktime& AT (33,7) USING "####" DEFAULT leaktime&
  if pr1 = 1 then gosub popup
  if pr1 = 0 then acc = 1
  IF ACC = 0 THEN LEAKTIME&=oldLEAKTIME&
  if acc = 1 then gosub doit
- GOTO LABEL ldataa
- LABEL doit
- CLEAR SCREEN
- GOSUB LABEL clcom
- COM: PUT COM 2 TEXT "!S1"
- COM: PUT COM 2 TEXT "!K"
  hilvl$ = STR$(hilvl)
  outstr$ = "!VAR40=" + hilvl$
- COM: PUT COM 2 TEXT outstr$
  lolvl$ = STR$(lolvl)
  outstr$ = "!VAR10=" + lolvl$
- COM: PUT COM 2 TEXT outstr$
  LEAKTIME$ = STR$(LEAKTIME&)
  outstr$ = "!VAR21=" + LEAKTIME$
- COM: PUT COM 2 TEXT outstr$
  NVOL&(5)=hilvl
  NVOL&(6)=lolvl
  NVOL&(9)=LEAKTIME&
- COM: PUT COM 2 TEXT "!DFAULT"
- RETURN
*>SCREEN errx1
- PUT LARGE TEXT AT (7,2): "ERROR!!"
- PUT TEXT AT (3,5): "THE NUMBER ENTERED IS OUT OF RANGE!"
- DELAY 1000
- GOTO SCREEN ldataa
*>SCREEN errx2
- PUT TEXT AT (2,5): "THE HIGH LIMIT MUST BE LARGER"
- PUT TEXT AT (2,6): "THAN THE LOW LIMIT"
- PUT LARGE TEXT AT (7,2): "ERROR!!"
- DELAY 1000
- GOTO SCREEN ldataa
- LABEL redox
- GOSUB LABEL clcom
- GOTO SCREEN redozz
*>SCREEN redozz
  GOTO lredozz
  REM tttitle$ = "TO START INTEGRA"
- GOSUB LABEL pccheck
  REM IF TTEMPASS$ = OPER1PASS$ THEN GOTO lredozz
  REM IF TTEMPASS$ = OPER2PASS$ THEN GOTO lredozz
  REM IF TTEMPASS$ = MASTERPASS$ THEN GOTO lredozz
  REM IF TTEMPASS$ = SUPERPASS$ THEN GOTO lredozz
```

```
  REM IF TTEMPASS$ = NVOL$(6) THEN GOTO lredozz
  REM IF TTEMPASS$ = MAINTPASS$ THEN GOTO lredozz
- GOTO SCREEN oper1
- LABEL lredozz
- CLEAR GRAPHICS SCREEN
- CLEAR SCREEN
- COM: PUT COM 2 TEXT "!DONX"
- PUT TEXT AT (2,5): "BAGS TO TST  =         BAG HEIGHT="
- PUT TEXT AT (2,6): "LOW COUNT    ="
- PUT TEXT AT (23,6): "HIGH COUNT="
- PUT LARGE TEXT AT (5,1): "INTEGRA RUN"
- PUT NUMBER lowcnt& AT (17,6) USING "#####"
- PUT NUMBER hicnt& AT (35,6) USING "#####"
- PUT NUMBER bagtolek& AT (17,5) USING "#####"
  IF hitbag<0 THEN hitbag = 0
- PUT NUMBER hitbag AT (35,5) USING "###.##"
- PUT TEXT AT (2,7): "BAG COUNT    ="
- PUT TEXT AT (23,7): "GOOD BAGS ="
- PUT TEXT AT (2,4): "HIGH LIMIT   ="
- PUT TEXT AT (23,4): "LOW LIMIT ="
- PUT NUMBER bn AT (17,7) USING "#####"
- PUT NUMBER fun AT (35,7) USING "#####"
- PUT NUMBER lolvl AT (35,4) USING "###.#"
- PUT NUMBER hilvl AT (17,4) USING "###.#"
- SOFTKEY (1) "BAGHT" GOTO SCREEN baght
- SOFTKEY (4) "STOP" GOTO SCREEN mstop
  LABEL redoz
  LABEL chk
- GOSUB LABEL tme
  oldhitbag = hitbag
- SOFTKEY CHECK
  CALL CURSOR (0)
  OUT BIN("111111111111111111111111")
  INP HITBAG&
  HITBAG = (16777215-HITBAG&) / 100
  IF hitbag = oldhitbag THEN GOTO chk
  if pptr = 1 then lprint hitbag;:lprint fun;:lprint bn
  LABEL chklo
  bn = bn +1
  if ipptr = 1 then print#1,hitbag
  DLIM&= DLIM&-1
  NVOL&(50)=DLIM&
  IF DLIM&= 0 THEN PRINT#1,CHR$(44)
  IF DLIM&= 0 THEN DLIM&= 500
  CALL WRNVOL&(HH,HITBAG)
  HH = HH + 1
  IF HH = 500 THEN HH = 100
  IF hitbag > lolvl THEN GOTO chkhi
- PUT REVERSE TEXT AT (2,3): "LOW BAG!   "
  lowcnt& = lowcnt& +1
  CALL CURSOR (0)
- GOTO LABEL update
```

```
  LABEL chkhi
  IF hitbag < hilvl THEN GOTO goodbagg
- PUT REVERSE TEXT AT (2,3): "HIGH BAG! "
  hicnt&= hicnt&+ 1
  CALL CURSOR (0)
- GOTO LABEL update
  LABEL goodbagg
- PUT TEXT AT (2,3): "GOOD BAG "
  CALL CURSOR (0)
  bagtolek& = bagtolek& -1
  IF BAGTOLEK& = 0 THEN GOSUB bag
  FUN = FUN + 1
- LABEL update
- GOSUB LABEL tme
- PUT NUMBER lowcnt& AT (17,6) USING "#####"
- PUT NUMBER hicnt& AT (35,6) USING "#####"
- PUT NUMBER hitbag AT (35,5) USING "###.##"
- PUT NUMBER bagtolek& AT (17,5) USING "#####"
- PUT NUMBER bn AT (17,7) USING "#####"
- PUT NUMBER fun AT (35,7) USING "#####"
      NVOL&(2)=lowcnt&
      NVOL&(3)=hicnt&
  GOTO chk
*>SCREEN baght
- PUT LARGE TEXT AT (6,1): "BAG HEIGHT"
- PUT LARGE TEXT AT (18,3): "MMS"
- SOFTKEY (1) "RUN" GOTO SCREEN 1redozz
- SOFTKEY (4) "STOP" GOTO SCREEN mstop
  LABEL chk1
- GOSUB LABEL tme
  oldhitbag = hitbag
- SOFTKEY CHECK
  CALL CURSOR (0)
  OUT BIN("111111111111111111111111")
  INP HITBAG&
  HITBAG = (16777215-HITBAG&) / 100
  IF hitbag = oldhitbag THEN GOTO chk1
  if pptr = 1 then lprint hitbag;:lprint fun;:lprint bn
  LABEL chklo1
  bn = bn +1
  if ipptr = 1 then print#1,hitbag
  DLIM&= DLIM&-1
  NVOL&(50)=DLIM&
  IF DLIM&= 0 THEN PRINT#1,CHR$(44)
  IF DLIM&= 0 THEN DLIM&= 500
  CALL WRNVOL&(HH,HITBAG)
  HH = HH + 1
  IF HH = 500 THEN HH = 100
  IF hitbag > lolvl THEN GOTO chkhi1
- PUT REVERSE LARGE TEXT AT (1,3): "LOW BAG! "
  lowcnt& = lowcnt& +1
  CALL CURSOR (0)
```

```
- GOTO LABEL update1
  LABEL chkhi1
  IF hitbag < hilvl THEN GOTO goodbag1
- PUT REVERSE LARGE TEXT AT (1,3): "HIGH BAG!"
  hicnt&= hicnt&+ 1
  CALL CURSOR (0)
- GOTO LABEL update1
  LABEL goodbag1
- PUT REVERSE LARGE TEXT AT (1,3): "GOOD BAG!"
  CALL CURSOR (0)
  bagtolek& = bagtolek& -1
  IF BAGTOLEK& = 0 THEN GOSUB bag1
  FUN = FUN + 1
- LABEL update1
- GOSUB LABEL tme
- PUT LARGE NUMBER hitbag AT (11,3) USING "###.##"
     NVOL&(2)=lowcnt&
     NVOL&(3)=hicnt&
  GOTO chk1

*>SCREEN hist
- PUT LARGE TEXT AT (4,1): "HISTORY MENU"
- PUT TEXT AT (2,4): "  :RESET INDEXER     :CLEAR FILE"
- PUT TEXT AT (2,5): "  :VIEW HISTORY      :PRESET INDEXER"
- PUT TEXT AT (2,6): "  :UPLOAD TO COMM1   :PRINT HISTORY"
- PUT TEXT AT (4,7): ":PREVIOUS MENU"
- PUT TEXT AT (22,7): "INDEXER ="
- PUT REVERSE TEXT AT (2,4): "F1"
- PUT REVERSE TEXT AT (22,4): "F2"
- PUT REVERSE TEXT AT (2,5): "F3"
- PUT REVERSE TEXT AT (22,5): "F4"
- PUT REVERSE TEXT AT (2,6): "F5"
- PUT REVERSE TEXT AT (22,6): "F6"
- PUT REVERSE TEXT AT (2,7): "F7"
- PUT NUMBER hh AT (32,7) USING "######"
- SOFTKEY (1) "RESET" GOTO SCREEN rees
- SOFTKEY (2) "CLEAR" GOTO SCREEN cll
- SOFTKEY (3) "VIEW" GOTO SCREEN view
- SOFTKEY (4) " SET" GOTO SCREEN sett
- SOFTKEY (5) "COMM1" GOTO SCREEN cmmm
- SOFTKEY (6) "PRINT" GOTO SCREEN ptt
- SOFTKEY (7) "" GOTO SCREEN leason
  CALL CURSOR (0)
- LABEL repp11
- GOSUB LABEL tme
- SOFTKEY CHECK
- GOTO LABEL repp11
*>SCREEN ptt
  CALL CURSOR (0)
- PUT TEXT AT (2,5): "PLEASE ENTER INDEXER # TO START..."
- GET NUMBER sind AT (2,6) USING "#####" DEFAULT 100
  IF SIND < 100 THEN GOTO ptt
```

```
       if sind >500 then goto ptt
-  PUT TEXT AT (2,5): "PLEASE ENTER INDEXER # TO END...    "
-  GET NUMBER eind AT (2,6) USING "#####" DEFAULT 500
   IF SIND > EIND THEN SIND =100
   IF EIND <101 THEN GOTO ptt
   IF EIND > 500 THEN GOTO ptt
-  CLEAR GRAPHICS SCREEN
-  CLEAR SCREEN
   CALL CURSOR (0)
-  PUT TEXT AT (10,5): "PRINTING HISTORY!"
-  PUT TEXT AT (10,4): "---PLEASE WAIT---"
   FOR R = SIND TO EIND
   CALL RDNVOL (R,FSD)
   LPRINT FSD
   NEXT R
-  GOTO SCREEN hist
*>SCREEN cmmm
   CALL CURSOR (0)
-  PUT TEXT AT (3,6): "PLEASE ENTER INDEXER # TO START...."
-  GET NUMBER sind AT (3,7) USING "#####" DEFAULT 100
   IF SIND < 100 THEN GOTO cmmm
   if sind >500 then goto cmmm
-  PUT TEXT AT (3,6): "PLEASE ENTER INDEXER # TO END...    "
-  GET NUMBER eind AT (3,7) USING "#####" DEFAULT 500
   IF SIND > EIND THEN SIND = 100
   IF EIND <101 THEN GOTO cmmm
   IF EIND > 500 THEN GOTO cmmm
-  CLEAR GRAPHICS SCREEN
-  CLEAR SCREEN
-  PUT TEXT AT (5,4): "DUMPING HISTORY TO COMM 1 PORT!"
-  PUT TEXT AT (10,3): "---PLEASE WAIT---"
   FOR R = SIND TO EIND
   CALL RDNVOL(R,FSA)
   PRINT #1,FSA
   NEXT R
-  GOTO SCREEN hist
*>SCREEN sett
   CALL CURSOR (0)
-  PUT TEXT AT (2,5): "PLEASE ENTER NEW NUMBER FOR INDEXER..."
-  GET NUMBER hh AT (2,6) USING "####" DEFAULT 100
   IF HH >500 THEN hh = 100
   IF HH <100 THEN HH = 100
-  GOTO SCREEN hist
*>SCREEN view
   CALL CURSOR (0)
-  PUT TEXT AT (4,4): "PLEASE ENTER INDEX VALUE TO START"
-  GET NUMBER vview AT (4,5) USING "#####" DEFAULT 100
   IF VVIEW <100 THEN GOTO view
   if vview >9961 then vview = 100
-  CLEAR GRAPHICS SCREEN
-  CLEAR SCREEN
-  SOFTKEY (7) "" GOTO SCREEN hist
```

```
- LABEL ffast
- SOFTKEY CHECK
  FOR R = 1 TO 8
  POS 7,R
  CALL RDNVOL(VVIEW+R,FDA)
  PRINT FDA;
  NEXT R
  FOR R = 1 TO 8
  POS 16,R
  CALL RDNVOL(VVIEW+(R+8),FDA)
  PRINT FDA;
  NEXT R
  FOR R = 1 TO 8
  POS 25,R
  CALL RDNVOL(VVIEW+(R+16),FDA)
  PRINT FDA;
  NEXT R
  FOR R = 1 TO 8
  POS 34,R
  CALL RDNVOL(VVIEW+(R+24),FDA)
  PRINT FDA;
  NEXT R
  FOR R = 1 TO 8
  POS 1,R
  REM PRINT (VVIEW+(R-1));".";
  NEXT R
  FOR R = 1 TO 8
  POS 10,R
  PRINT (VVIEW+(R-1)+8);".";
  NEXT R
  FOR R = 1 TO 8
  POS 19,R
  PRINT (VVIEW+(R-1)+16);".";
  NEXT R
  FOR R = 1 TO 8
  POS 28,R
  PRINT (VVIEW+(R-1)+24);".";
  NEXT R
- GOTO LABEL ffast
*>SCREEN rees
  HH = 100
- GOTO SCREEN hist
*>SCREEN cll
  CALL CURSOR (0)
- PUT TEXT AT (6,4): "CLEARING ARRAY, PLEASE WAIT"
  FOR R = 100 TO 500
  CALL WRNVOL&(R,0)
  NEXT R
  hh = 100
- GOTO SCREEN hist
*>SCREEN test
  IF PR2 = 0 THEN GOTO ltest
```

```
    TTTITLE$ = "TEST 5 BAGS"
-   GOSUB LABEL pccheck
    IF TTEMPASS$ = OPER1PASS$ THEN GOTO ltest
    IF TTEMPASS$ = OPER2PASS$ THEN GOTO ltest
    IF TTEMPASS$ = MASTERPASS$ THEN GOTO ltest
    IF TTEMPASS$ = SUPERPASS$ THEN GOTO ltest
    IF TTEMPASS$ = MAINTPASS$ THEN GOTO ltest
    IF TTEMPASS$ = NVOL$(6) THEN GOTO ltest
-   GOTO SCREEN oper1
-   LABEL ltest
-   CLEAR GRAPHICS SCREEN
-   CLEAR SCREEN
-   GOSUB LABEL clcom
    oldlo = lolvl
    lolvl = 65.0
    oldhi = hilvl
    hilvl = 120.0
-   GOSUB LABEL doit
    testcnt& = 0
    total& = 0.0
    avg = 0
-   PUT TEXT AT (12,2): "TEST FIVE BAGS"
-   COM: PUT COM 2 TEXT "!S"
-   COM: PUT COM 2 TEXT "!K"
-   COM: PUT COM 2 TEXT "!VAR8=1"
-   COM: PUT COM 2 TEXT "!DONX"
-   PUT TEXT AT (2,5): "BAG HEIGHT =          HIGH LIMIT ="
-   PUT TEXT AT (2,6): "BAG  COUNT  =          LOW  LIMIT ="
-   PUT TEXT AT (2,7): "AVG.HEIGHT ="
-   SOFTKEY (4) "STOP" GOTO SCREEN sttp
-   SOFTKEY (6) "RESET" GOTO SCREEN test
-   PUT NUMBER testcnt& AT (15,6) USING "##"
-   PUT NUMBER oldlo AT (35,6) USING "###.##"
-   PUT NUMBER oldhi AT (35,5) USING "###.##"
-   PUT NUMBER avg AT (15,7) USING "###.##"
-   DELAY 3000
-   LABEL rep6
-   GOSUB LABEL tme
    oldhitbag = hitbag
-   PUT REVERSE TEXT AT (11,3): "ENTER A TEST BAG"
-   SOFTKEY CHECK
    OUT BIN("111111111111111111111111")
    INP HITBAG&
    HITBAG = (16777215-HITBAG&) / 100
    IF hitbag = oldhitbag THEN GOTO rep6
-   PUT TEXT AT (11,3): "                    "
-   PUT NUMBER hitbag AT (15,5) USING "###.##"
    IF HITBAG < HILVL THEN GOTO ffsr
-   PUT REVERSE TEXT AT (12,3): "BAG  TOO  HIGH"
-   DELAY 1000
-   PUT REVERSE TEXT AT (12,3): "DISCARD BAD BAG"
-   DELAY 1000
```

```
- PUT TEXT AT (12,3): "                    "
- GOTO LABEL rep6
- LABEL ffsr
- PUT TEXT AT (12,3): "                    "
  IF HITBAG > LOLVL THEN GOTO goodbag
- PUT REVERSE TEXT AT (12,3): " BAG TOO LOW!"
- DELAY 1000
- PUT REVERSE TEXT AT (11,3): "DISCARD BAD BAG!"
- DELAY 1000
- PUT TEXT AT (11,3): "                    "
- GOTO LABEL rep6
- LABEL goodbag
- PUT TEXT AT (10,3): "                    "
- PUT REVERSE TEXT AT (14,3): "GOOD   BAG!"
- DELAY 1000
  TESTCNT& = TESTCNT& + 1
  TOTAL = TOTAL + HITBAG
- PUT NUMBER testcnt& AT (15,6) USING "##"
  AVG = TOTAL/TESTCNT&
- PUT NUMBER avg AT (14,7) USING "###.##"
  IF TESTCNT& < 5 THEN GOTO rep6
- PUT NUMBER avg AT (14,7) USING "###.##"
- DELAY 2000
- GOTO SCREEN limits
*>SCREEN limits
- PUT TEXT AT (12,2): "ENTER NEW LIMITS "
- PUT TEXT AT (3,3): "LIMIT WINDOW MUST  BE AT LEAST 8 MM"
- PUT TEXT AT (1,5): "AVG HEIGHT =        HIGH LIMIT ="
- PUT TEXT AT (21,6): "LOW   LIMIT ="
- PUT NUMBER avg AT (14,5) USING "###.##"
- PUT NUMBER oldlo AT (34,6) USING "###.##"
- PUT NUMBER oldhi AT (34,5) USING "###.##"
- SOFTKEY (6) "REDO" GOTO SCREEN limitts
- PUT TEXT AT (6,7): "ENTER NEW LOW LIMIT..."
- GET NUMBER lolvl AT (28,7) USING "###.##" DEFAULT oldlo
  if lolvl <50 then gosub errt1
  if lolvl > 130 then gosub errt1
- PUT NUMBER lolvl AT (34,6) USING "###.##"
- PUT TEXT AT (6,7): "                    "
- PUT TEXT AT (4,7): "ENTER THE NEW HIGH LIMIT..."
- GET NUMBER hilvl AT (31,7) USING "###.##" DEFAULT oldhi
  if hilvl > 130 then gosub errt1
  if hilvl < 50 then gosub errt1
- PUT NUMBER hilvl AT (34,5) USING "###.##"
- PUT TEXT AT (4,7): "                    "
- SOFTKEY CHECK
  IF LOLVL > HILVL THEN GOSUB errt2
  DIFF = HILVL - LOLVL
  if diff < 8 then gosub errt3
- GOSUB LABEL clcom
- GOSUB LABEL doit
- GOTO LABEL oper1
```

```
*>SCREEN sttp
- GOSUB LABEL clcom
- GOTO SCREEN oper1
*>SCREEN errt1
- LABEL errt1
- CLEAR GRAPHICS SCREEN
- CLEAR SCREEN
- PUT LARGE TEXT AT (7,2): "ERROR!!"
- PUT TEXT AT (4,5): "THE NUMBER ENTERED IS OUT OF RANGE"
- DELAY 1000
- RETURN
*>SCREEN errt2
- LABEL errt2
- CLEAR GRAPHICS SCREEN
- CLEAR SCREEN
- PUT LARGE TEXT AT (7,2): "ERROR!!"
- PUT TEXT AT (6,5): "THE HIGH LIMIT MUST BE LARGER"
- PUT TEXT AT (6,6): "THAN THE LOWER LIMIT!"
- DELAY 1000
- RETURN
*>SCREEN errt3
- LABEL errt3
- CLEAR GRAPHICS SCREEN
- CLEAR SCREEN
- PUT LARGE TEXT AT (7,2): "ERROR!!"
- PUT TEXT AT (5,5): "THE LIMIT WINDOW MUST BE 8 MM."
- DELAY 1000
- RETURN
*>SCREEN clt
  TITLE$ = "CLEAR BAG COUNTERS"
  if pr1 = 1 then gosub popup
  if pr1 = 0 then acc = 1
  if acc = 0 then goto oper1
  lowcnt& = 0
  hicnt& = 0
  NVOL&(2)=lowcnt&
  NVOL&(3)=hicnt&
  lowcnt&=NVOL&(2)
  hicnt&=NVOL&(3)
  BN = 0
  FUN = 0
  bz = 1
- GOTO LABEL ldataa
*>SCREEN maint1
  TTTITLE$ = "MAINTENANCE MENU"
- GOSUB LABEL pccheck
  IF TTEMPASS$ = MAINTPASS$ THEN GOTO lmaint1
  IF TTEMPASS$ = SUPERPASS$ THEN GOTO lmaint1
  IF TTEMPASS$ = MASTERPASS$ THEN GOTO lmaint1
  IF TTEMPASS$ = NVOL$(6) THEN GOTO lmaint1
- GOTO SCREEN oper1
- LABEL lmaint1
```

```
- CLEAR GRAPHICS SCREEN
- CLEAR SCREEN
- GOSUB LABEL clcom
- COM: PUT COM 2 TEXT "!MA0,"
- COM: PUT COM 2 TEXT "!MC01"
- COM: PUT COM 2 TEXT "!A100,100"
- COM: PUT COM 2 TEXT "!V8,10"
- COM: PUT COM 2 TEXT "!D25000"
- COM: PUT COM 2 TEXT "!HOM1"
  distdn$ = "!D25000"
  distup$ = "!D-25000"
  dist& = 25000
  dis = dist
- LABEL leason
- CLEAR SCREEN
- CLEAR GRAPHICS SCREEN
- PUT LARGE TEXT AT (3,1): "MAINTENANCE MENU"
- PUT TEXT AT (2,4): "F1:SYS.PARAMETERS    F2:CALIBRATE FORCE"
- PUT TEXT AT (2,5): "F3:USER PROMPTS      F4:DATA EXPORT"
- PUT TEXT AT (2,6): "F5:CALIBRATE HEIGHT F6:HISTORY"
- PUT TEXT AT (2,7): "F7:RETURN TO MENU    F8:FORCE MOVE"
- PUT REVERSE TEXT AT (2,4): "F1"
- PUT REVERSE TEXT AT (22,4): "F2"
- PUT REVERSE TEXT AT (2,5): "F3"
- PUT REVERSE TEXT AT (22,5): "F4"
- PUT REVERSE TEXT AT (2,6): "F5"
- PUT REVERSE TEXT AT (22,6): "F6"
- PUT REVERSE TEXT AT (2,7): "F7"
- PUT REVERSE TEXT AT (22,7): "F8"
- SOFTKEY (1) "PARA" GOTO SCREEN syspara
- SOFTKEY (2) "FORCE" GOTO SCREEN may
- SOFTKEY (3) "USER" GOTO SCREEN user
- SOFTKEY (4) "DATA" GOTO SCREEN ddata
- SOFTKEY (5) "CALIB" GOTO SCREEN calib
- SOFTKEY (6) "HIST" GOTO SCREEN hist
- SOFTKEY (7) "MENU" GOTO SCREEN oper1
- SOFTKEY (8) "FORCE" GOTO SCREEN force
  CALL CURSOR (0)
- LABEL repp12
- GOSUB LABEL tme
- SOFTKEY CHECK
- GOTO LABEL repp12
*>SCREEN ddata
  IF PPTR = 1 THEN GOTO look
  if pr2 = 0 then goto lddata
  tttitle$ = "TURN DATA EXPORT ON"
- GOSUB LABEL pccheck
  IF TTEMPASS$ = SUPERPASS$ THEN GOTO lddata
  IF TTEMPASS$ = MASTERPASS$ THEN GOTO lddata
  IF TTEMPASS$ = NVOL$(6) THEN GOTO lddata
  GOTO leason
- LABEL lddata
```

```
    TITLE$ = "TURN DATA EXPORT ON"
- CLEAR SCREEN
    if pr1 = 1 then gosub popup
    if pr1 = 0 then acc = 1
    IF ACC = 0 THEN GOTO leason
- PUT LARGE TEXT AT (4,3): "DATA EXPORT ON"
    PPTR = 1
- DELAY 300
- GOTO SCREEN leason
- LABEL look
    if pr2 = 0 then goto llook
    tttitle$ = "TURN DATA EXPORT OFF"
- GOSUB LABEL pccheck
    IF TTEMPASS$ = SURERPASS$ THEN GOTO llook
    IF TTEMPASS$ = MASTERPASS$ THEN GOTO llook
    IF TTEMPASS$ = NVOL$(6) THEN GOTO llook
    GOTO leason
- LABEL llook
    title$ = "TURN DATA EXPORT OFF"
- CLEAR SCREEN
    if pr1 = 1 then gosub popup
    if pr1 = 0 then acc = 1
    IF ACC = 0 THEN GOTO leason
- PUT LARGE TEXT AT (3,3): "DATA EXPORT OFF!"
    PPTR = 0
- DELAY 300
- GOTO SCREEN leason
*>SCREEN force
- PUT TEXT AT (11,2): "FORCE MOVEMENT MENU"
- PUT TEXT AT (2,4): "F1:MOVE DOWN         F2:MOVE UP"
- PUT TEXT AT (2,5): "F3:GO HOME           F4:SPARE"
- PUT TEXT AT (2,6): "F5:SPARE             F6:START INDEX CONV"
- PUT TEXT AT (2,7): "F7:RETURN TO MENU    F8:STOP INDEX CONV"
- PUT REVERSE TEXT AT (2,4): "F1"
- PUT REVERSE TEXT AT (21,4): "F2"
- PUT REVERSE TEXT AT (2,5): "F3"
- PUT REVERSE TEXT AT (21,5): "F4"
- PUT REVERSE TEXT AT (2,6): "F5"
- PUT REVERSE TEXT AT (21,6): "F6"
- PUT REVERSE TEXT AT (2,7): "F7"
- PUT REVERSE TEXT AT (21,7): "F8"
- SOFTKEY (1) "DOWN" GOTO SCREEN movdn
- SOFTKEY (2) " UP" GOTO SCREEN movup
- SOFTKEY (3) "HOME" GOTO SCREEN gohome
- SOFTKEY (7) "MAINT" GOTO SCREEN leason
- SOFTKEY (4) "" GOTO SCREEN force
- SOFTKEY (5) "" GOTO SCREEN force
- SOFTKEY (6) "" GOTO SCREEN staind
- SOFTKEY (7) "MENU" GOTO SCREEN oper1
- SOFTKEY (8) "" GOTO SCREEN stoind
    CALL CURSOR (0)
- LABEL repp13
```

```
- GOSUB LABEL tme
- SOFTKEY CHECK
- GOTO LABEL repp13
*>SCREEN staind
  CALL CURSOR (0)
- GOSUB LABEL clcom
- PUT TEXT AT (9,4): "START INDEX CONVEYOR!!"
- COM: PUT COM 2 TEXT "!OUTXXXXXXXXXXXXXXXXXXXXXX1XX"
- DELAY 1000
- GOTO SCREEN force
*>SCREEN stoind
  CALL CURSOR (0)
- GOSUB LABEL clcom
- PUT TEXT AT (9,4): "STOP INDEX CONVEYOR!"
- COM: PUT COM 2 TEXT "!OUTXXXXXXXXXXXXXXXXXXXXXX0XX"
- DELAY 1000
- GOTO SCREEN force

*>SCREEN may
- CLEAR SCREEN
- CLEAR GRAPHICS SCREEN
- PUT LARGE TEXT AT (3,1): "CALIBRATE FORCE "
- PUT TEXT AT (2,4): "   :ZERO LOAD CELL      :SPAN LOAD CELL"
- PUT TEXT AT (2,7): "   :PREVIOUS MENU"
- PUT REVERSE TEXT AT (2,4): "F1"
- PUT REVERSE TEXT AT (22,4): "F2"
- PUT REVERSE TEXT AT (2,7): "F7"
- SOFTKEY (1) "ZERO" GOTO SCREEN zero
- SOFTKEY (2) "SPAN" GOTO SCREEN span
- SOFTKEY (7) "" GOTO SCREEN leason
  CALL CURSOR (0)
- LABEL repp14
- GOSUB LABEL tme
- SOFTKEY CHECK
- GOTO LABEL repp14

*>SCREEN zero
- PUT LARGE TEXT AT (8,1): "ZERO"
- PUT TEXT AT (3,4): "BE SURE THERE IS NO PRESSURE ON THE "
- PUT TEXT AT (11,5): "MOTION PLATFORM!!!"
- SOFTKEY (1) " -OK-" GOTO SCREEN ok14
- LABEL repp15
- GOSUB LABEL tme
- SOFTKEY CHECK
- GOTO LABEL repp15
- LABEL ok14
- SOFTKEY (1) "" GOTO SCREEN may
- PUT TEXT AT (2,4): "                                        "
- PUT TEXT AT (11,5): "                    "
- PUT TEXT AT (20,6): "VOLTS OFFSET"
- GOSUB LABEL clcom
- COM: PUT COM 2 TEXT "!ZERO1"
```

```
- DELAY 5000
- LABEL rezero
- GOSUB LABEL tme
  oldb = b
  OUT BIN("111111111111111111111111")
- I/O: GET I/O NUMBER b&
  b = (16777215 - b&) / 100
  IF olb = b THEN GOTO rezero
  B$ = BIN$(B)
  POS 8,4:PRINT B$
- PUT NUMBER b AT (12,6) USING "###.##"
- SOFTKEY (2) " -OK-" GOTO SCREEN may
- LABEL repp16
- GOSUB LABEL tme
- SOFTKEY CHECK
- GOTO LABEL repp16

*>SCREEN span
- PUT LARGE TEXT AT (8,1): "SPAN"
- PUT TEXT AT (3,4): "PLACE A GOOD BAG ON PLATFORM!!"
- PUT TEXT AT (1,5): "APPLY APPROXIMATELY 2000 GRAMS FORCE TO"
- PUT TEXT AT (3,6): "THE BAG USING THE MOVE COMMANDS."
- PUT TEXT AT (5,7): "(OBSERVE THE BAG DEFLECTION)"
- SOFTKEY (1) "-OK-" GOTO SCREEN span1
- LABEL repr16
- GOSUB LABEL tme
- SOFTKEY CHECK
- GOTO LABEL repr16

*>SCREEN spanx
- PUT TEXT AT (7,1): "ADJUST LOAD CELL AMPLIFIER"
- PUT TEXT AT (1,3): "PLACE A VOLT METER (SET TO DC) ON THE"
- PUT TEXT AT (1,4): "OUTPUT OF THE LOAD CELL AMPLIFIER."
- PUT TEXT AT (4,5): "ADJUST THE SPAN POT UNTIL THE "
- PUT TEXT AT (6,6): "VOLT-METER READS 1.5 volts."
- SOFTKEY (1) "-OK-" GOTO SCREEN span2
- LABEL repr16x
- GOSUB LABEL tme
- SOFTKEY CHECK
- GOTO LABEL repr16x

*>SCREEN span1
- PUT TEXT AT (22,4): "SPAN VOLTS"
- PUT NUMBER b AT (13,4) USING "###.##"
- PUT TEXT AT (2,5): "F1:MOVE DOWN          F2:MOVE UP"
- PUT TEXT AT (2,6): "F3:SET DISTANCE       F4:GO TO HOME"
- PUT TEXT AT (2,7): "F7:PREVIOUS MENU      F6:SPAN"
- PUT LARGE TEXT AT (8,1): "SPAN"
- SOFTKEY (1) "MOVDN" GOTO SCREEN mvdn
- SOFTKEY (2) "MOVUP" GOTO SCREEN mvup
- SOFTKEY (3) "DIST" GOTO SCREEN dist1
- SOFTKEY (4) "HOME" GOTO SCREEN home1
```

```
- SOFTKEY (6) "SPAN" GOTO SCREEN spanx
- SOFTKEY (7) "" GOTO SCREEN may
- LABEL repp17
- GOSUB LABEL tme
- SOFTKEY CHECK
- GOTO LABEL repp17

- LABEL mvdn
- GOSUB LABEL clcom
- CLEAR GRAPHICS SCREEN
- CLEAR SCREEN
- PUT LARGE TEXT AT (6,3): "MOVE DOWN"
- COM: PUT COM 2 TEXT distdn$
- COM: PUT COM 2 TEXT "!GO1X"
- DELAY 1000
- COM: PUT COM 2 TEXT "!POLL"
- DELAY 1000
- LABEL respan
- GOSUB LABEL tme
  oldb = b
  OUT BIN("111111111111111111111111")
- I/O: GET I/O NUMBER b&
  B = (16777215 - B& ) / 100
  IF oldb = b THEN GOTO respan
- GOTO SCREEN span1

- LABEL mvup
- GOSUB LABEL clcom
- CLEAR GRAPHICS SCREEN
- CLEAR SCREEN
- PUT LARGE TEXT AT (7,3): "MOVE UP"
- COM: PUT COM 2 TEXT distup$
- COM: PUT COM 2 TEXT "!GO1X"
- DELAY 1000
- COM: PUT COM 2 TEXT "!POLL"
- DELAY 1000
  OUT BIN("111111111111111111111111")
- I/O: GET I/O NUMBER b&
  B = (16777215 - B&) / 100
- GOTO SCREEN span1

*>SCREEN dist1
- PUT LARGE TEXT AT (5,1): "SET DISTANCE"
- GOSUB LABEL clcom
- PUT TEXT AT (4,4): "PRESENT DISTANCE =          STEPS"
- PUT NUMBER dis AT (23,4) USING "#######"
- SOFTKEY (1) "SET" GOTO SCREEN set1
- SOFTKEY (2) "-OK-" GOTO SCREEN span1

- LABEL repp19
- GOSUB LABEL tme
- SOFTKEY CHECK
```

```
- GOTO LABEL repp19

- LABEL set1
- PUT TEXT AT (6,5): "SET DISTANCE:        STEPS"
- GET NUMBER dis AT (19,5) USING "######" DEFAULT dis
  DIST$ = STR$(DIS)
  distdn$= "!D"+dist$
  distdn$= "!D-"+dist$
- COM: PUT COM 2 TEXT distdn$
- DELAY 1000
- GOTO SCREEN dist1

- LABEL home1
- GOSUB LABEL clcom
- CLEAR GRAPHICS SCREEN
- CLEAR SCREEN
- PUT LARGE TEXT AT (5,3): "GOING HOME!"
- COM: PUT COM 2 TEXT "!HOM1"
- DELAY 2000
- GOTO SCREEN span1

- LABEL span2
- GOSUB LABEL clcom
- CLEAR GRAPHICS SCREEN
- CLEAR SCREEN
- PUT LARGE TEXT AT (5,3): "SETTING SPAN"
- DELAY 2000
- COM: PUT COM 2 TEXT "!SPAN1"
- DELAY 5000
  OUT BIN("111111111111111111111111")
  INP B&
  B& = (16777215 - B&) / 100
- SOFTKEY (5) "MAINT" GOTO SCREEN maint1

- LABEL repp22
- GOSUB LABEL tme
- SOFTKEY CHECK
- GOTO LABEL repp22

- GOTO SCREEN leason

*>SCREEN movdn
- PUT TEXT AT (6,5): "SET DISTANCE:        STEPS"
- GET NUMBER dis AT (25,5) USING "######" DEFAULT 25000
- PUT TEXT AT (2,5): "                                        "
- PUT LARGE TEXT AT (4,3): "MOVING DOWN!"
  DIST$ = STR$(DIS)
  distdn$= "!D"+dist$
  distup$= "!D-"+dist$
- COM: PUT COM 2 TEXT distdn$
- COM: PUT COM 2 TEXT "!GO1,0"
- DELAY 1000
```

```
- GOTO SCREEN force
*>SCREEN movup
- PUT TEXT AT (6,5): "SET DISTANCE:         STEPS"
- GET NUMBER dis AT (19,5) USING "######" DEFAULT 25000
- PUT TEXT AT (2,5): "                                    "
- PUT LARGE TEXT AT (5,2): "MOVING UP!"
  DIS = (-1*DIS)
  DIST$ = STR$(DIS)
  DISTUP$ = "!D"+DIST$
- COM: PUT COM 2 TEXT distup$
- COM: PUT COM 2 TEXT "!GO1,0"
- DELAY 1000
- GOTO SCREEN force
*>SCREEN gohome
- PUT LARGE TEXT AT (7,2): "GO HOME!"
- COM: PUT COM 2 TEXT "HOM1,X"
- DELAY 1000
- GOTO SCREEN force
*>SCREEN calib
- PUT LARGE TEXT AT (2,1): "CALIBRATE INTEGRA"
- PUT TEXT AT (2,3): "PRESENT CALIBRATION DISTANCE ="
- PUT NUMBER calval AT (33,3) USING "##.#"
- PUT TEXT AT (36,3): " mm"
- COM: PUT COM 2 TEXT "!K:HOM1"
- COM: PUT COM 2 TEXT "!V2,"
- COM: PUT COM 2 TEXT "!D280000"
- COM: PUT COM 2 TEXT "!GO1"
- PUT TEXT AT (2,4): "ENTER DISTANCE FROM THE BOTTOM OF THE"
- PUT TEXT AT (2,5): "MOTION PLATFORM TO THE TOP OF CONVEYER"
- PUT TEXT AT (7,6): "mm"
- GET NUMBER calval AT (2,6) USING "##.#" DEFAULT calval
- PUT NUMBER calval AT (32,3) USING "##.#"
  NVOL&(7)=calval
  calval$ = STR$(calval)
  outstr$ = "!VAR20=" + calval$
- COM: PUT COM 2 TEXT outstr$
- COM: PUT COM 2 TEXT "!HOM1"
- GOTO SCREEN leason
*>SCREEN syspara
- PUT TEXT AT (1,2): " EASON VER.              PARAMETERS"
  POS 13,2:VER
- PUT TEXT AT (22,6): "PROGRAM SIZE"
- PUT TEXT AT (2,3): "MAX. STR.SPACE"
- PUT TEXT AT (2,4): "FREE STR.SPACE"
- PUT TEXT AT (2,5): "USER DEF.SPACE"
- PUT TEXT AT (22,7): "ARRAY SPACE"
- PUT TEXT AT (2,6): "VARIBLE  SPACE"
- PUT TEXT AT (22,4): "FREE MEMORY"
- PUT TEXT AT (22,5): "STK.SP.USED"
- PUT TEXT AT (22,3): "MEMORY OPT."
- PUT NUMBER fre(1) AT (35,6) USING "#####"
- PUT NUMBER fre(2) AT (17,3) USING "####"
```

```
-   PUT NUMBER fre(3) AT (17,4) USING "####"
-   PUT NUMBER fre(4) AT (17,5) USING "####"
-   PUT NUMBER fre(5) AT (35,7) USING "#####"
-   PUT NUMBER fre(6) AT (17,6) USING "####"
-   PUT NUMBER fre(7) AT (35,4) USING "#####"
-   PUT NUMBER fre(8) AT (35,5) USING "#####"
-   PUT NUMBER fre(9) AT (35,3) USING "###"
-   PUT TEXT AT (38,3): "KB"
-   SOFTKEY (1) " -OK-" GOTO SCREEN leason
-   SOFTKEY (7) "MENU" GOTO SCREEN oper1
    CALL CURSOR (0)
-   SOFTKEY WAIT LABEL bag
-   COM: PUT COM 2 TEXT "!VAR45=1"
-   PUT TEXT AT (2,3): "PINLEAK TEST"
    BAGTOLEK& = LEAKCNT&
-   RETURN LABEL bag1
-   COM: PUT COM 2 TEXT "!VAR45=1"
-   PUT REVERSE LARGE TEXT AT (1,3): "PIN LEAK!"
-   PUT TEXT AT (2,3): "PINLEAK TEST"
    BAGTOLEK& = LEAKCNT&
-   RETURN

*>SCREEN badcnt
-   PUT LARGE NUMBER badcount& AT (9,1) USING "###"
-   PUT LARGE TEXT AT (5,2): "CONSECUTIVE"
-   PUT LARGE TEXT AT (6,3): "BAD BAGS"
-   GOSUB LABEL clcom
       badcount& = 0
-   SOFTKEY (1) "OPER1" GOTO SCREEN oper1
-   SOFTKEY (7) "MENU" GOTO SCREEN oper1
    CALL BOX (239,0,0,63,1)
-   SOFTKEY WAIT
*>SCREEN mstop
-   PUT LARGE TEXT AT (4,2): "MACHINE STOP!"
-   GOSUB LABEL clcom
-   COM: PUT COM 2 TEXT "!DFAULT"
-   DELAY 1000
-   HOT KEY (9) RESUME
-   CLEAR SCREEN
-   GOTO LABEL oper1
-   LABEL clcom
-   COM: PUT COM 2 TEXT "!S11"
-   COM: PUT COM 2 TEXT "!K"
-   COM: PUT COM 2 TEXT "!OUTXXXXXXXXXXXXXXXXX01XX00XX"
-   RETURN
-   LABEL st
-   PUT REVERSE HUGE TEXT AT (1,2): " INTEGRA  "
-   PUT REVERSE HUGE TEXT AT (1,1): " ACCU-PAK "
```

```
- DELAY 2000
  T = 0
  F = 239 - T
  FOR R = 0 TO 31
  CALL LINE (0,R,239,R,0)
  CALL LINE (0,(63-R),239,(63-R),0)
  FOR Y = 1 TO 4
  CALL LINE (T,0,T,63,0)
  CALL LINE (F,0,F,63,0)
  T = T + 1
  F = 239 - T
  NEXT Y
  NEXT R
- RETURN
- LABEL popup
- CLEAR GRAPHICS SCREEN
- CLEAR SCREEN
- GOSUB LABEL boxx
- PUT TEXT AT (10,3): "ARE YOU SURE YOU WANT"
- PUT TEXT AT (10,4): "TO MAKE THIS CHANGE ?"
- PUT TEXT AT (10,5): "F1: YES      F6: NO"
  print
  print"          ";title$
  CALL BOX (210,51,30,3,101)
- SOFTKEY (1) "YES" GOTO SCREEN sub1
- SOFTKEY (6) " NO" GOTO SCREEN sub2
- SOFTKEY (7) "MENU" GOTO SCREEN oper1
  CALL CURSOR (0)
- SOFTKEY WAIT
- LABEL reret
- RETURN
*>SCREEN sub1
  acc = 1
- GOTO LABEL reret
*>SCREEN sub2
  acc = 0
- GOTO LABEL reret
*>SCREEN user
  IF PR1 = 1 THEN DCP$ = "YES"
  IF PR1 = 0 THEN DCP$ = "NO"
  IF PR2 = 1 THEN PP$ = "YES"
  IF PR2 = 0 THEN PP$ = "NO"
  POS 23,4
  PRINT DCP$
  POS 23,5
  PRINT PP$
- PUT LARGE TEXT AT (5,1): "USER PROMPTS"
- PUT TEXT AT (3,4): "DATA CHANGE PROMPT"
- PUT TEXT AT (3,5): "PASSWORD PROMPT"
- PUT TEXT AT (3,6): "F1:TOGGLE DATA CHANGE PROMPT"
- PUT TEXT AT (3,7): "F2:TOGGLE PASSWORD PROMPT"
- PUT REVERSE TEXT AT (3,6): "F1"
```

```
- PUT REVERSE TEXT AT (3,7): "F2"
- SOFTKEY (1) "DATA" GOTO SCREEN sbb1
- SOFTKEY (2) "PASS" GOTO SCREEN sbb2
- SOFTKEY (6) "EXIT" GOTO SCREEN leason
- SOFTKEY (7) "MENU" GOTO SCREEN oper1
  CALL CURSOR (0)
- SOFTKEY WAIT
*>SCREEN sbb1
  TITLE$ = "TOGGLE DATA CHG PROMPT"
- GOSUB LABEL popup
  IF ACC = 0 THEN GOTO user
  OLDPR1 = PR1
  IF PR1 = 0 THEN PR1 = 1
  IF OLDPR1 = 1 THEN PR1 = 0
  NVOL&(27) = PR1
- GOTO SCREEN user
*>SCREEN sbb2
  TITLE$ = "TOGGLE PASSWORD PROMPT"
- GOSUB LABEL popup
  if acc = 0 then goto user
  OLDPR2 = PR2
  IF PR2 = 0 THEN PR2 = 1
  IF OLDPR2 = 1 THEN PR2 = 0
  NVOL&(28) = PR2
- GOTO SCREEN user
*>SCREEN screem
- COM: INIT COM 2 ECHO 1 BAUD 96 HANDSHAKE 0 TIMEOUT 250 STRIP 1
  WHILE LOC(2)>0
  INPUT$ #2, 1, JUNK$
  WEND
- RETURN
- LABEL ssop1
  TTITLE$ = "OPERATOR 1"
  OLDOPER1PASS$ = OPER1PASS$
  GOSUB pc IF TEMPASS$ = "" THEN OPER1PASS$ = OLDOPER1PASS$
  IF ACC = 0 THEN OPER1PASS$ = OLDOPER1PASS$
  IF ACC = 1 THEN OPER1PASS$ = TEMPASS$
  IF ACC = 1 THEN NVOL$(4) = OPER1PASS$
  GOTO fries
- LABEL ssop2
  TTITLE$ = "OPERATOR 2"
  OLDOPER2PASS$ = OPER2PASS$
  GOSUB pc
  IF TEMPASS$ = "" THEN OPER2PASS$ = OLDOPER2PASS$
  IF ACC = 0 THEN OPER2PASS$ = OLDOPER2PASS$
  IF ACC = 1 THEN OPER2PASS$ = TEMPASS$
  IF ACC = 1 THEN NVOL$(5) = OPER2PASS$
  GOTO fries
- LABEL ssm
  ttitle$ = "MASTER"
```

```
  OLDMASTERPASS$ = MASTERPASS$
  GOSUB pc
  IF TEMPASS$ = "" THEN MASTERPASS$ = OLDMASTERPASS$
  IF ACC = 0 THEN MASTERPASS$ = OLDMASTERPASS$
  IF ACC = 1 THEN MASTERPASS$ = TEMPASS$
  IF ACC = 1 THEN NVOL$(1) = MASTERPASS$
  GOTO fries
- LABEL sss
  ttitle$ = "SUPERVISOR"
  OLDSUPERPASS$ = SUPERPASS$
  GOSUB pc
  IF TEMPASS$ = "" THEN SUPERPASS$ = OLDSUPERPASS$
  IF ACC = 0 THEN SUPERPASS$ = OLDSUPERPASS$
  IF ACC = 1 THEN SUPERPASS$ = TEMPASS$
  IF ACC = 1 THEN NVOL$(2) = SUPERPASS$
  GOTO fries
- LABEL sst
  ttitle$ = "MAINTENANCE"
  OLDMAINTPASS$ = MAINTPASS$
  GOSUB pc
  IF TEMPASS$ = "" THEN MAINTPASS$ = OLDMAINTPASS$
  IF ACC = 0 THEN MAINTPASS$ = OLDMAINTPASS$
  IF ACC = 1 THEN MAINTPASS$ = TEMPASS$
  IF ACC = 1 THEN NVOL$(3) = MAINTPASS$
  GOTO fries
*>SCREEN pc
- LABEL pc
- CLEAR GRAPHICS SCREEN
- CLEAR SCREEN
  CALL BOX (210,51,30,3,1)
  POS 11,3
  PRINT"PLEASE ENTER NEW"
  POS 11,4
  PRINT"PASSWORD"
  POS 11,2
  PRINT TTITLE$;
  POS 11,5
   INPUT TEMPASS$
  TITLE$ = "CHANGE PASSWORD TO  "+TEMPASS$
- GOSUB LABEL popup
  IF ACC = 0 THEN TEMPASS$ = ""
  RETURN
- LABEL boxx
  CALL BOX (150,38,90,18,101)
- DELAY 50
  CALL BOX (180,43,60,10,101)
- DELAY 50
  CALL BOX (210,51,30,3,101)
- RETURN
*>SCREEN pccheck
  CALL BOX (210,51,30,3,1)
  POS 8,4
```

```
   PRINT"PLEASE ENTER PASSWORD....";
   POS 8,3
   PRINT TTTITLE$;
   POS 8,5
   INPUT TTEMPASS$
-  RETURN
-  LABEL timm
-  CLEAR GRAPHICS SCREEN
-  CLEAR SCREEN
-  PUT TEXT AT (9,2): "CURRENT LINE SETTINGS"
-  PUT TEXT AT (2,4): "BAUD RATE         DATABITS"
-  PUT TEXT AT (2,5): "STOPBITS          PARITY"
-  PUT TEXT AT (2,6): "HANDSHAKE         STRIP LF"
-  PUT TEXT AT (2,7): "TIMEOUT =        ms"
-  PUT NUMBER timo AT (12,7) USING "#####"
   BAUDR = BAU *100
-  PUT NUMBER baudr AT (12,4) USING "#####"
   IF DATABI = 7 THEN DATABI$ = "7"
   IF DATABI = 8 THEN DATABI$ = "8"
   POS 30,4
   PRINT DATABI$
   POS 12,5
   PRINT STOPBI
   IF PARIT = 0 THEN PARIT$ = "NONE"
   IF PARIT = 1 THEN PARIT$ = "EVEN"
   IF PARIT = 2 THEN PARIT$ = "ODD"
   POS 30,5
   PRINT PARIT$
   IF HAND = 0 THEN HAND$ = "NO"
   IF HAND = 1 THEN HAND$ = "YES"
   POS 12,6
   PRINT HAND$
   IF STRI = 0 THEN STRI$ = "NO"
   IF STRI = 1 THEN STRI$ = "YES"
   POS 31,6:PRINT STRI$
   CALL BOX (239,0,0,63,1)
-  RETURN
-  LABEL exit
-  CLEAR GRAPHICS SCREEN
-  CLEAR SCREEN
-  END OF PSEUDOCODE
```

```
DEL CALIB
DEF CALIB

;****************       CALIB-1.PRG          09-12-94

VAR61=0
VAR90=100
VAR16=0                 ;ZERO
VAR17=0                 ;SPAN
VAR18=0                 ;OFFSET
VAR19=0                 ;SLOPE

;****** SET ZERO ( OFFSET )**********
WRITE"SET ZERO"
TIMST0
WAIT(TIM>5000)
   WHILE (VAR90>0)
      VAR62=0
      VAR62=1ANV
      VAR61=VAR62 + VAR61
      VAR90=VAR90-1
;WRITE"FORCE = "
;WRVAR62
   NWHILE

VAR62=VAR61/100
   WRITE"AVERAGE ZERO = "
   WRVAR62
   VAR16=VAR62

;****** SET SPAN **********
VAR61=0
VAR90=100
WRITE"SET SPAN,    ADD 1500 GRAMS WEIGHT"
TIMST0
WAIT(TIM>15000)
WRITE"START SPAN CALIBRATION"
   WHILE (VAR90>0)
      VAR62=0
      VAR62=1ANV
      VAR61=VAR62 + VAR61
      VAR90=VAR90-1
;WRITE"FORCE = "
;WRVAR62
   NWHILE

VAR62=VAR61/100
   WRITE"AVERAGE SPAN = "
   WRVAR62
   VAR17=VAR62

;*******    Y = MX + B ***************
```

```
;*******   M = (Y = B)/X *************

VAR18 = VAR16              ;SET OFFSET
VAR19=(VAR17 - VAR16)/1500
WRITE"SLOPE = "
WRVAR19

END
```

```
DEL ERR1
DEF ERR1

;ERR1-1.PRG        UDATED    09-12-94

;THIS PROGRAM IS EXECUTED VIA AN INTERUPT ANY TIME ONE OF THE
        ;KILL INPUT IS RECEIVED FROM THE SOFT STOP PUSH BUTTON (IN.2)

;WRITE"RUNNING ERR1"

OUTXXXXXXXXXXXXXXXX01XX00XX        ;TURN ON RED LIGHT AND OFF REJECT,
                                   ;AND BAGGER ENABLE

!K11                               ;STOP MOTION IN ALL DRIVES

IF(ER=bXXXXXX1)                    ;IF USER FAULT INPUT RECEIVED
   GOTO DFAULT                     ;RUN DFAULT PROGRAM
NIF

END
```

```
        DEL DFAULT
        DEF DFAULT

;DFAULT-1.PRG     UPDATED     09-12-94
                ;
                ;              CAPE COD UNIT #1
                ;
                ;DESIGNED FOR COMPUMOTOR S8 DRIVE FOR AXIS #1

;THIS PROGRAM SETS THE DEFAULT VALUES FOR ALL VARIABLES
                ;IN CASE NO VALUES ARE ENTERED BY THE OPERATOR.
                ;WHEN PROGRAM IS COMPLETED, PRESS IS SENT TO HOME AND
                ;PROGRAM EXECUTION IS TERMINATED.
                ;
                ;Added calibration variable (VAR20)
                ;MODIFIED PIN LEAK TEST       04-25-94
                ;ADDED CODE FOR FIRST TIME INITIALIZATION         9-12-94

;**********************************************************************

;        CODE FOR FIRST TIME INITIALIZATION

IF(VAR150<>12345.0)
           VAR150=1
           REPEAT
              VAR(VAR150)=VAR150
              VAR150=VAR150+1
           UNTIL(VAR150>=150)
           VAR150=12345.0
           VAR16=0.05668           ;LOAD CELL CALIBRATE (ZERO)    B
           VAR17=1.5007            ;LOAD CELL CALIBRETE (SPAN)    Y
                                   ;X CALIBRATE = 2000grams
           VAR19=0.00054           ;LOAD CELL SLOPE (M=(Y-B)/X)
           VAR20=58                ;DEFAULT CALIBRATION DISTANCE IN mms
           VAR21=20                ;TIME FOR PIN LEAK TEST IN SECONDS
           VAR39=290000            ;DISTANCE TO LOWER LIMIT IN STEPS
           VAR43=0.15              ;FORCE IN ANALOG VOLTS TO PRESS (150mv)
        NIF
;**********************************************************************
ECHO0                              ;DISABLE ECHO
; ECHO1                              ;ENABLE ECHO
ONCOND0000                         ;DISABLE INTERRUPT
A300,100                           ;SET ACCEL
AD800,600                          ;SET DECEL
V4,10                              ;SET VELOCITY VARB2=b00000000000000001111111111111111
VARB3=b11111111111111110000000000000000

IF (VAR40>120 OR VAR40<65)
   VAR40=120                       ;MAX DEFAULT BAG HEIGHT 120mm
```

```
NIF

VAR41=0                           ;MAX DISTANCE TO TOP OF SCALE
VAR11=0                           ;MAX HEIGHT IN STEPS

VAR1=30                           ;PRESS, HIGH SPEED
VAR2=10                           ;PRESS, LOW SPEED
VAR3=0                            ;INDEX COUNT FLAG1
VAR4=0                            ;INDEX COUNT FLAG2
VAR5=0                            ;INTERRUPT DURING PROCESS FLAG
VAR6=0                            ;PRESS, READY POSITION
VAR7=0                            ;REPOSITION COUNTER
VAR8=0                            ;TEST FIVE BAGS FLAG
VAR9=0                            ;INTERROGATION IN PROGRESS FLAG
IF (VAR10>80 OR VAR10<65)
    VAR10=65                      ;MIN DEFAULT BAG HEIGHT 65mm
NIF
VAR12=0                           ;MIN HEIGHT IN STEPS
VAR13=0                           ;GATE INTERRUPT (CONVEYOR EYE)
VAR14=0                           ;DIFFERENCE BETWEEN MAX AND MIN IN STEPS
VAR15=1                           ;START-UP FLAG

;Y=MX+B
VAR16=VAR16                       ;LOAD CELL CALIBRATE (ZERO)  B
VAR17=VAR17                       ;LOAD CELL CALIBRATE (SPAN)  Y
                                  ;X CALIBRATE = 2000G
VAR18=0                           ;LOAD CELL OFFSET
VAR19=VAR19                       ;LOAD CELL SLOPE {M=(Y-B)/X}

VAR20=VAR20                       ;DEFAULT CALIBRATION DISTANCE IN mms
VAR21=VAR21                       ;DEFAULT TIME FOR LEAK TEST
VAR22=VAR21*1000
VAR23=0                           ;PIN LEAK INITIAL POSITION
VAR24=0                           ;PIN LEAK NEW POSITION
VAR25=0                           ;PIN LEAK INITIAL FORCE
VAR26=0                           ;PIN LEAK NEW FORCE
VAR27=500                         ;DEFAULT TIME TO PROCESS BAG
VAR30=0                           ;APPROX. (VAR40-VAR10+.5mm)
VAR39=VAR39                       ;DISTANCE TO LOWER LIMIT IN STEPS
VAR40=VAR40                       ;MAX DEFAULT BAG HEIGHT IN mm
VAR41=VAR41                       ;MAX DISTANCE TO TOP OF SCALE
VAR42=0                           ;BAG HEIGHT IN XX mm
VAR43=VAR43                       ;FORCE IN ANALOG VOLTS TO PRESS (DEFAULT 150mv)
VAR44=0                           ;SPARE
VAR45=0                           ;SPARE
VAR46=0                           ;SPARE
VAR47=0                           ;SPARE
VAR48=0                           ;ELAPSED TIME TO PROCESS
VAR49=0                           ;PM POSITION IN STEPS
VAR50=0                           ;BAG HEIGHT IN STEPS
VAR51=0                           ;SPARE
VAR52=0                           ;BAD BAG FLAG
```

```
VAR73=0                    ;(VAR19 * VAR78) + VAR18
VAR75=0                    ;CAPTURED DISTANCE TO STOP PRESS
VAR76=0                    ;CAPTURED DISTANCE FOR BAG HEIGHT
VAR78=0                    ;ANALOG VALUE FROM JOY STICK PORT #1
VAR80=0                    ;SPARE
VAR85=0                    ;SPARE
VAR90=300                  ;DEFAULT ACCELERATION VALUE

COMEXC0                    ;EXIT CONTINOUS COMMAND MODE
T1.0                       ;DELAY ONE SECOND

WAIT(MOV=b0X)              ;WAIT FOR MOTION TO STOP
HOM1                       ;SEND PRESS TO HOME

T.01                       ;DELAY
WAIT(MOV=b0X)              ;WAIT FOR MOTION TO STOP
PSET0,0                    ;SET POSITION COUNTER TO 0
ZERO1                      ;ZERO THE LOAD CELL

END
```

```
DEL SPAN1
DEF SPAN1

;******************   SPAN1-1.PRG           09-12-94

;****** SET SPAN **********
VAR61=0
VAR90=100
;WRITE"SET SPAN,    ADD 2000 GRAMS WEIGHT"
TIMST0
WAIT(TIM>1500)
;WRITE"START SPAN CALIBRATION"
   WHILE (VAR90>0)
     VAR62=1ANV
     VAR61=VAR62 + VAR61
     VAR90=VAR90-1
;WRITE"FORCE = "
;WRVAR62
   NWHILE

VAR62=VAR61/100
;WRITE"AVERAGE SPAN = "
;WRVAR62
   VAR17=VAR62

;*******    Y = MX + B ***************
;*******    M = (Y - B)/X *************

VAR18 = VAR16                 ;GET OFFSET
   VAR19=(VAR17 - VAR18)/2000    ;CALCULATE SLOPE
;WRITE"SLOPE = "
;WRVAR19

VARB1=VCVT(VAR19 * 100)             ;OUTPUT SPAN VALUE TO EASON
   OUT(VARB1)
   T.01

END
```

```
***************************POWER UP PROGRAM*************************

DEL PWRUP
DEF PWRUP                 ;DEFINE POWER UP PROGRAM

;MODIFIED 09-12-94        INTEGRA 1000-01    PWRUPI-1.PRG
        ;
        ;                INTEGRA UNIT #1
        ;
        ;DESIGNED FOR THE COMPUMOTOR S8 DRIVE ON AXIS #1 AND
        ;     SETUP FOR CCW TO HOME,  CW TO PRESS
        ;        TOP LIMIT     CCW
        ;        BOTTOM LIMIT  CW
        ;THIS PROGRAM IS EXECUTED UPON POWER UP AUTOMATICALLY.
        ;IT INITIALIZES THE COMPUMOTOR INDEXER AND DRIVES.
        ;IT ALSO ENABLES THE DISP. CONVEYOR EYE AND ERROR INTERUPTS.
        ;FINALLY IT EXECUTES THE DEFAULT VALUE PROGRAM.

;********************ENABLE ERROR HANDLING PROGRAM*****************

ERRORP ERR1                    ;SPECIFIES NAME OF ERROR PROGRAM
ERROR0000001X0                 ;DEFINE AND ENABLE ERROR CONDITIONS

;*******************DISABLE COMMAND EXECUTION MODES****************

COMEXS1
COMEXC0

;******************************SCALING****************************

SCALE 0                 ;DISABLE SCALE FACTORS

;******************************DRIVES*****************************

DRIVE 1,0               ;ENABLE DRIVES
PULSE 0.3,16.0          ;SET PULSE WIDTH FOR COMPUMOTOR S8 & D10 DRIVES
DRES 25000,2000         ;MATCH INDEXER AND DRIVE RESOLUTION
DRFLVL 0                ;SET DRIVE FAULT LEVEL TO ACTIVE HIGH
INFEN 1                 ;ENABLE DRIVE FAULT INPUT

;****************************HARD LIMITS**************************

LH 3,0                  ;ENABLE LIMITS FOR DRIVE 1-DISABLE DRIVE 2 LIMITS
LHAD 700,100            ;SET HARD LIMIT DECELERATION
LHLVL 11,XX             ;SET LIMIT SWITCH ACTIVE LEVEL TO HIGH

;****************************HOME LIMITS**************************

HOMA 350,100            ;SET HOME ACCEL.
HOMAD 600,100           ;SET HOME DECEL.
HOMLVL 0,0              ;SET HOME SWITCH ACTIVE LOW
HOMV 25,1               ;SET HOME VELOCITY
```

```
HOMBAC1                     ;HOME BACKUP ENABLE
HOMVF2                      ;HOME FINAL VELOCITY
HOMDF1                      ;HOME FINAL DIRECTION=CCW
HOMEDG0                     ;HOME REFERENCE CW EDGE

;*************************ACCELERATION / DECELERATION*****************

MA00                        ;INCREMENTAL MODE
MC00                        ;PLACE DRIVE 1, PLATFORM, PRESET MODE
                            ;PLACE DRIVE 2, CONVEYOR, CONTINOUS MODE

A500,100                    ;DEFAULT ACCELERATION
AD600,100                   ;DEFAULT DECELERATION
V10,5                       ;DEFAULT VELOCITY
D100000,0                   ;DEFAULT DISTANCE (+ = DOWN DIRECTION)

;*****************************REGISTRATION****************************

REGA0,0                                  ;DISABLE REGISTRATION MOVES
REGB0,0

;**************************INPUTS AND TRIGGERS************************

INLVL 000100000000000000000000 ;SET ACTIVE LEVEL OF INPUTS, CASE PACKER
                            ;       TROUBLE  NC

INFNC 2-F                   ;DEFINE IN.2 (SOFT STOP) AS A USER FAULT
INFNC 4-A                   ;DEFINE NORMAL INPUT, CASE PACKER TROUBLE
INFNC 25-A                  ;DEFINE NORMAL INPUT
INFNC 26-A                  ;DEFINE NORMAL INPUT

;**************************END SETUP PROGRAM**************************

OUT111111111111111100000000    ;INITIALIZE OUTPUTS

;WRITE"RUN DEFAULT PROGRAM"

DFAULT                      ;RUN SETUP PROGRAM

END                         ;END PROGRAM DEFINITION
```

```
    DEL DONX
    DEF DONX
            ;PROGRAM DONX-1.PRG        09-12-94

;DEVELOPED FOR       INTEGRA 1000-1

;ADDED INTERRUPT FOR SYNCHRONIZING   04-07-94
            ;MODIFIED PIN LEAK TEST     04-25-94
            ;MODIFIED FOR CHECK-WEIGHER  07-13-94
            ;INDEX PLATFORM CONVEYOR WITH BAG DROP SIGNAL  07-18-94
            ;ADDED INFEED OVERIDE CONTROLS          07-19-94
            ;ADDED CHECK-WEIGHER BLOW-OFF LOGIC     08-31-94
            ;MODIFIED PIN LEAK TEST
            ;ADDED FLAGS FOR FIVE BAG TEST          09-12-94

;****************** 6200 INPUTS ********************************

;IN.1    BYPASS SWITCH   1 = ON, 0 = OFF
            ;IN.2    SOFT STOP       1 = ON, 0 = OFF
            ;IN.3    BAG DROP, 1 = ON, 0 = OFF
            ;IN.4    CASE PACKER TROUBLE, 1 = ON, 0 = OFF
            ;IN.5    SPARE
            ;IN.6    CHECK WEIGHER "OVER"
            ;IN.7    CHECK WEIGHER "ACCEPT"
            ;IN.8    CHECK WEIGHER "UNDER"
            ;IN.25 (TRIGGER A) SPARE
            ;IN.26 (TRIGGER B) INDEX IN PROGRESS

;****************** 6200 OUTPUTS *******************************

;OUT.1 - OUT.16  OUTPUTS TO EASON
            ;OUT.17  REJECT SOLENOID (BLOW OFF), 1 = ON, 0 = OFF
            ;OUT.18  RED LAMP (MACHINE STOP), 1 = ON, 0 = OFF
            ;OUT.19  BLUE LAMP (RESERVED), 1 = ON, 0 = OFF
            ;OUT.20  AMBER LAMP (LEAK DETECTED), 1 = ON, 0 = OFF
            ;OUT.21  GREEN LAMP & BAGGER ENABLE
            ;OUT.22  START INDEXING CONVEYOR
            ;OUT.23  INFEED CONVEYOR OVERRIDE
            ;OUT.24  SPARE

;*********************** START *********************************

$STARTX
  ECHO0                                 ;DISABLE ECHO
;  ECHO1                                ;ENABLE ECHO
  IF(VAR8=1)                            ;CHECK TEST FIVE BAGS FLAG
    VAR27=2000                          ;SET TIME TO PROCESS BAG TO 2 MIN
  NIF
  IF(VAR8=0)
    VAR27=500                           ;DEFAULT TIME IS 0.5 SECONDS
  NIF
```

```
COMEXS1                                  ;CONTINUOUS COMMAND EXECUTION

************************************************************************

VARB2=b00000000000000001111111111111111
VARB3=b11111111111111110000000000000000

VAR3=-1                                  ;INDEX COUNT FLAG1
VAR4=0                                   ;INDEX COUNT FLAG2
VAR5=0                                   ;INTERRUPT DURING PROCESS FLAG
VAR20=VAR20                              ;CALIBRATION DISTANCE
VAR16=VAR16                              ;LOAD CELL ZERO (OFFSET)
VAR41=(VAR20*600000/150)+280000          ;MAXIMUM DISTANCE TO PLATFORM
VAR11=VAR41-(VAR40*600000/150)           ;MAX HEIGHT IN STEPS
VAR12=VAR41-(VAR10*600000/150)           ;MIN HEIGHT IN STEPS
VAR6=VAR11-50000                         ;PRESS, READY POSITION
VAR14=VAR12-VAR6+1000                    ;HEIGHT DIFFERENCE IN STEPS
VAR19=VAR19                              ;DEFAULT SLOPE
VAR22=VAR21*1000                         ;PIN LEAK TIME
VAR30=VAR12+1000                         ;APPROX. (VAR40-VAR10+0.5MM)
VAR43=VAR43                              ;DEFAULT PRESSURE IN GRAMS
VAR73=0                                  ;FORCE
VAR75=0                                  ;CAPTURED PM VALUE
VAR78=0
VAR90=VAR90                              ;ACCELERATION VALUE
IF (VAR30 > VAR39)                       ;SET MINIMUM HEIGHT BASED ON THE
    VAR30=VAR39                          ; LOWER PROX LIMIT
NIF
COMEXC0                                  ;EXIT CONTINUOUS COMMAND MODE
T1.0                                     ;DELAY ONE SECOND
HOM1X                                    ;HOME PRESS
WAIT(MOV=b0)                             ;WAIT FOR PLATFORM TO STOP
PSET0                                    ;RESET POSITION COUNTER TO 0

MA0X                                     ;PRESS, set incremental mode
MC0X                                     ;CONVEYOR, set continuous run mode A(VAR90)                                 ;SET ACCEL
AD800                                    ;SET DECEL
V(VAR1)                                  ;SET HIGH VAL (VAR3)

MA1X                                     ;PRESS ABSOLUTE MODE
D(VAR6)                                  ;PRESS, SET READY POSITION
COMEXC1                                ;ENABLE CONTINUOUS COMMAND PROCESSING MODE

GO1X                                     ;INITIATE MOVE
T.01                                     ;DELAY
WAIT(MOV=b0)
VAR45=0                                  ;TIME FOR LEAK DETECT FLAG
VAR9=0                                   ;INIT. INTERROGATION IN PROGRESS FLAG

VAR52=0                                  ;RESET BAD BAG FLAG
```

```
    OUTXXXXXXXXXXXXXXXXX00000XXX              ;TURN OFF BLOW-OFF AND LAMPS
    OUTXXXXXXXXXXXXXXXXXXXXX1XXX              ;ENABLE BAGGER

;***************** ROUTINE RETURN ****************************************

$B4LOOX

OUTXXXXXXXXXXXXXXXXX0XXX1XXX              ;TURN OFF REJECT & ENABLE BAGGER

IF (IN.1=b1)                                ;CHECK BYPASS SWITCH ON
    WAIT(MOV=b0)                              ;WAIT FOR MOTION TO CEASE
    JUMP BYPASX
  NIF

;***************** CHECK FOR CASE PACKER TROUBLE ************************

IF(IN.4=b0)
    VAR15=0                                   ;RESET START-UP FLAG
  NIF
  IF(IN.4=b1 AND VAR15=0)                     ;CHECK IF CASE PACKER TROUBLE REMAINS
;WRITE"CASE PACKER TROUBLE"
    OUTXXXXXXXXXXXXXXXX0100001X               ;TURN ON RED LAMP & DISABLE BAGGER,
                                              ;INFEED CONVEYOR OVERRIDE
    WAIT(IN.4=b0 OR VAR15=1)                  ;WAIT UNTIL CASE PACKER READY
;WRITE"CASE PACKER CLEAR"
    OUTXXXXXXXXXXXXXXXXX0000100X              ;TURN OFF RED LAMP, ENABLE BAGGER,
                                              ;RELEASE INFEED CONVEYOR OVERRIDE
  NIF

;***************** CONTINUE AFTER CASE PACKER CLEAR *****************

WAIT(MOV=b0)                                ;WAIT FOR MOTION TO STOP

MA0X                                        ;PRESS, INCREMENTAL MODE
;WRITE"WAIT FOR BAG DROP"
  WAIT(IN.3=b1)                               ;WAIT FOR BAG DROP
; TIMST0                                      ;RESET & START TIMER

IF(IN.6=b1 OR IN.8=b1)                ;LOOK AT CHECK-WEIGHER
          IF(VAR3=1)                          ;PREVIOUS BAD WEIGHT
            VAR4=1                            ;SET INDEX COUNT FLAG2
;WRITE"NOT ACCEPT, TWO IN A ROW"
            JUMP XITXX
          NIF
          VAR3=2                              ;SET INDEX COUNT FLAG1
;WRITE"NOT ACCEPT"
        NIF
$XITXX

;WRITE"START BAG"

IF(VAR3=2 OR VAR3=1)                        ;CHECK INDEX COUNT FLAG
```

```
    VAR3=VAR3-1                                 ;DECREMENT INDEX COUNT
;WRITE"VAR3 = "
;WRVAR3
 NIF

VAR9=1                                         ;SET INTERROGATION IN PROGRESS FLAG HIGH
 T.015
;**********************************************************************
;BEGIN INTERROGATION
;**********************************************************************

WAIT(IN.26=b0)                              ;WAIT FOR INDEX TO STOP
        OUTXXXXXXXXXXXXXXXX0X0XXXXX             ;TURN OFF REJECT & BLUE LAMP

IF(VAR3=0 OR VAR4=1)                    ;CHECK-WEIGHER FLAGS
           VAR52=1                              ;SET BAD BAG FLAG
           OUTXXXXXXXXXXXXXXXXXXX1XXXXX         ;TURN ON BLUE LAMP
           VAR3=-1                              ;RESET INDEX COUNT FLAG1
           IF(VAR4=1)
              VAR3=1                            ;KEEP INDEX COUNT FLAG1 SET
              VAR4=0                            ;RESET INDEX COUNT FLAG2
           NIF
        NIF
        IF (VAR52=1)                            ;IF BAD BAG FLAG SET
           OUTXXXXXXXXXXXXXXXXXX1XXXXXXX        ;TURN ON REJECT
;WRITE"BLOW-OFF!!!!!!!"
           VAR52=0                              ;RESET BAD BAG FLAG
        NIF

;WRITE "START"
;        TIMSTP
;WRITE"TIME TO INDEX = " .
;VAR80=TIM
;WRVAR80

T.01
        WAIT(MOV=b0)                            ;MAKE SURE PLATFORM IS NOT MOVING
        MA0X
        D(VAR14)                                ;SET DISTANCE TO DIFFERENCE BETWEEN
                                                ;MAXIMUM AND MINIMUM HEIGHT
        V(VAR2)                                 ;SET PRESS TO SLOW SPEED
        GO1X
        T.01
        TIMST0
        VAR75=0
        VAR76=0

REPEAT
          VAR78=1ANV                            ;READ ANALOG INPUT PORT #1
                                                ;   (PRESS LOAD CELL VALUE
                  ;CALCULATE FORCE
                                                ;Y=MX+B
```

```
                                            ;Y=VAR78,M=VAR19,B=VAR18
                                            ;X = (Y-B)/M
            ;VAR73=(VAR78-VAR18)/VAR19      ;VAR19 = .00015 ( DEFAULT VALUE )
                                            ;VAR18 = 0      ( DEFAULT VALUE )

;WRITE"VAR73 ="
;WRVAR73
        VAR75=PM
        UNTIL (VAR78 > VAR43 OR TIM>=VAR27 OR VAR75>=VAR30 OR IN.3=b1)
        TIMSTP
        IF(IN.3=b1)
          VAR5=1
        NIF
        S1
        WAIT(MOV=b0)
        VAR76=PM
;WRITE"VAR76= "
;WRVAR76
;WRITE"VAR75= "
;WRVAR75
        MA1X                                ;SET PRESS, ABSOLUTE MODE
        D(VAR6)                             ;GO TO READY POSITION
        V(VAR1)                             ;SET HIGH SPEED
        GO1X                                ;MOVE PLATFORM
        T.01
        WAIT(MOV=b0)                        ;WAIT UNTIL MOTION STOPS
        COMEXC1                             ;ENABLE CONTINUOUS COMMAND PROCESSING MODE

IF(VAR5=1)
;WRITE"INTERRUPT DURING PROCESS"
        VAR75=VAR11 + 8000                  ;MAKE BAG HEIGHT = MAX - 2mm
        VAR5=0
        ;JUMP PASSX
        NIF

;IF(VAR78>VAR43)
;WRITE"VAR78 FINAL ="
;WRVAR78
;NIF
;IF(TIM>VAR26)
;WRITE"TOO MUCH TIME"
;NIF
        IF(VAR75>VAR12)
;WRITE"PM = "
;WRVAR75
          VAR75=VAR30
        NIF

VAR42=(VAR41-VAR75)*(150/600000)
;WRITE"BAG HEIGHT ="
;WRVAR42
            IF(VAR42>VAR40)
```

```
              VAR52 = 1
;WRITE"HIGH BAG"
           NIF
           IF (VAR42<VAR10)
              VAR52 = 1
;WRITE"LOW BAG"
           NIF
           VARB4=OUT
           VARB4=VARB4&VARB2              ;ZERO FIRST 16 BITS
           VARB1=VCVT(VAR42 * 100)
           VARB1=VARB1&VARB3              ;ZERO LAST 8 BITS
           VARB1=VARB1|VARB4              ;COMBINE WITH LAST OUT
           OUT(VARB1)
           T.01
           VAR50=VAR30
           IF(VAR45=1 AND VAR52=0)        ;TIME FOR LEAK DETECT & GOOD BAG
              GOSUB LEAKY                 ;INTERVAL, RUN LEAK DETECT
           NIF
 JUMP PASSX
;*********************************************************************
;PASS BAG THROUGH
;*********************************************************************
 $PASSX
 WAIT(MOV=b0X)                            ;WAIT UNTIL MOTION STOPS
 VAR9=0                                   ;SET INTERROGATION IN PROGRESS FLAG LOW

;WRITE"EXIT"

JUMP B4LOOX

;*********************************************************************
;BYPASS MODE
;*********************************************************************
 $BYPASX
    WAIT(MOV=b0X)                         ;WAIT UNTIL MOTION STOPS
;WRITE "BEGIN BYPASS MODE"
    MA0X                                  ;SET PRESS TO INCREMENTAL

HOM1                                  ;SEND PRESS HOME
    OUTXXXXXXXXXXXXXXXXX000010XX          ;TURN OFF ,BLOWOFF, LAMPS, AND ENABLE
                                          ;BAGGER
    WAIT(MOV=b0X)                         ;WAIT UNTIL MOTION STOPS $BYPAXZ
    WAIT(IN.3=b1 OR IN.1=b0)              ;WAIT FOR BAG DROP OR BYPASS TO NORMAL

;***************** CHECK FOR CASE PACKER TROUBLE ************************

IF(IN.4=b0)
     VAR15=0                              ;RESET START-UP FLAG
  NIF
  IF(IN.4=b1 AND VAR15=0)                 ;CHECK IF CASE PACKER TROUBLE REMAINS
```

```
;WRITE"CASE PACKER TROUBLE - BYPASS MODE"
    OUTXXXXXXXXXXXXXXXXX0100001X        ;TURN ON RED LAMP & DISABLE BAGGER,
                                        ;INFEED CONVEYOR OVERRIDE
    WAIT(IN.4=b0 OR VAR15=1)            ;WAIT UNTIL CASE PACKER READY
;WRITE"CASE PACKER CLEAR - BYPASS MODE"
    OUTXXXXXXXXXXXXXXXXX0000100X        ;TURN OFF RED LAMP, ENABLE BAGGER,
                                        ;RELEASE INFEED OVERRIDE
NIF

;***************** CONTINUE AFTER CASE PACKER CLEAR ********************

IF(IN.1=b1)                         ;CHECK IF STILL IN BYPASS MODE
;WRITE"STILL IN BYPASS"
    JUMP BYPAXZ                         ;STILL IN BYPASS
    NIF
;WRITE "END BYPASS MODE"
    A(VAR90)                            ;SET ACCEL
    V(VAR1)                             ;SET HIGH VALOCITY
    MA1X                                ;PRESS ABSOLUTE MODE
    D(VAR6)                             ;PRESS, set ready pos
    COMEXC1                             ;ENABLE CONTINUOUS COMMAND PROCESSING MODE
    GO1X                                ;INITIATE MOVE
    T.01                                ;DELAY 10 mS
    WAIT(MOV=b0)                        ;WAIT UNTIL MOTION COMPLETE
    VAR45=0                             ;LEAK LOOP COUNTER
    VAR9=0                              ;INIT. INTERROGATION IN PROGRESS FLAG

JUMP B4LOOX                         ;GO TO TOP OF LOOP

;**********************************************************************
;**********************************************************************
;PIN LEAK TEST
;**********************************************************************
;**********************************************************************

$LEAKX                              ;DEFINE LABEL LEAK

;WRITE"PIN LEAK TEST"                   ;WRITE PIN LEAK TEST TO SCREEN
    OUTXXXXXXXXXXXXXXXXX010100XX        ;DISABLE BAGGER
                                        ;TURN ON AMBER LAMP
    VAR22=VAR21                         ;SET TIME COUNT EQUAL TO LEAK TIME
    VAR7=0                              ;SET REPOSITION COUNTER
    WAIT(MOV=b0)                        ;WAIT FOR MOTION TO STOP
    COMEXC0                             ;DISABLE CONTINUOUS COMMAND EXECUTION MODE

D(VAR75)                            ;SET TO CAPTURED BAG HEIGHT
    V4                                  ;SLOW THE VELOCITY
    GO1                                 ;GO TO BAG HEIGHT
    T.01
    WAIT(MOV=b0)
    MA0X                                ;PRESS TO INCREMENTAL MODE
```

```
    VAR23=1PM                                   ;CAPTURE INITIAL POSITION
    VAR24=VAR23                                 ;INITIALIZE NEW POSITION
;WRITE"INITIAL POSITION = "
;WRVAR23
    VAR25=1ANV                                  ;CAPTURE INITIAL FORCE
    VAR26=VAR25                                 ;INITIALIZE NEW FORCE
;WRITE"INITIAL FORCE = "
;WRVAR25
       TIMST0
    $PRESSX
       IF(VAR26<=VAR25 AND VAR7<2 AND TIM<VAR22)
          IF(VAR24>=VAR23 AND VAR24<VAR30)
             D600                               ;MOVE DOWN .125mm
             V2
             GO1X
             T.5
             WAIT(MOV=b0)
             VAR24=1PM                          ;CAPTURE NEW POSITION
;WRITE"NEW POSITION = "
;WRVAR24
             VAR26=1ANV                         ;CAPTURE NEW FORCE
             VAR7=VAR7+1
;WRITE"NEW FORCE = "
;WRVAR26
;WRVAR7
             JUMP PRESSX
          NIF
       ELSE
          VAR26=1ANV                            ;CAPTURE NEW FORCE
          IF(TIM>=VAR22)
             JUMP PASSEX
          NIF
          IF(VAR7<2)
             JUMP PRESSX
          NIF
       NIF
       TIMSTP
    $PASSEX
       IF(VAR24<=VAR30 AND VAR26>=VAR25 AND TIM>=VAR22 AND VAR7<2)

;**************  BAG PASSED  *******************************************

VAR9=0                                ;SET INTERROGATION IN PROGRESS FLAG LOW
          VAR45=0                               ;RESET TIME FOR LEAK TEST FLAG
          MA1X                                  ;SET PRESS, ABSOLUTE MODE
          D(VAR6)                               ;GO TO READY POSITION
          V(VAR1)                               ;SET HIGH SPEED
          GO1X                                  ;MOVE PLATFORM
          T.01
          WAIT(MOV=b0)                          ;WAIT UNTIL MOTION STOPS
          COMEXC1                               ;ENABLE CONTINUOUS COMMAND PROCESSING MODE
```

```
            OUTXXXXXXXXXXXXXXXXX000010XX    ;ENABLE BAGGER
                                            ;TURN OFF REJECT,AND LAMPS
;WRITE"BAG PASSED"

JUMP PASSX                      ;RESUME PROCESSING

ELSE

;*************** BAG FAILED *******************
;WRITE"BAG FAILED!!!!!!"
;IF(VAR26<VAR25)
;WRITE"DECREASING FORCE"
;NIF
;IF(VAR24>VAR30)
;WRITE"BAG COLLAPSED"
;NIF
;IF(VAR7>=2)
;WRITE"TOO MANY STEPS"
;WRVAR7
;NIF
            T1
            !S1                             ;STOP THE PROCESS
            WAIT(MOV=b0)

OUTXXXXXXXXXXXXXXXXX011100XX    ;TURN ON RED, AMBER & BLUE LAMPS
                                            ;& TURN OFF BAGGER
            HOM1X
            WAIT(MOV=b0)
            VAR45=0
            !K                              ;KILL PROGRAM
        NIF

;**********************************************************************
;**********************************************************************
;PROGRAM END
;**********************************************************************
;**********************************************************************

END                                 ;TERMINATE PROGRAM DEFINITION
```

```
DEL ZERO1
DEF ZERO1

;************************  ZERO1-1.PRG    09-12-94

VAR61=0
VAR99=100

;****** SET ZERO ( OFFSET )**********
;WRITE"SET ZERO    BE SURE LOAD CELL PLATFORM IS CLEAR!!!!"
TIMST0
WAIT(TIM>1000)
;WRITE"CHECKING ZERO"
   WHILE (VAR99>0)
     VAR62=1ANV
     VAR61=VAR62 + VAR61
     VAR99=VAR99-1
   NWHILE

VAR62=VAR61/100
;WRITE"AVERAGE ZERO = "
;WRVAR62
   VAR16=VAR62
   VAR18=VAR16
   VARB1=VCVT(VAR18 * 100)            ;OUTPUT ZERO VALUE TO EASON
;WRITE"ZERO VALUE  (VARB1) ="
;WRVARB1
;WRITE"ZERO VALUE   (VAR16) ="
;WRVAR16
;WRITE"ZERO VALUE   (VARB3) ="
;WRVARB3
   OUT(VARB1)
   T.01

END
```

I claim:

1. A process for testing seal quality and height of flexible packages containing stored products and fluid therein comprising:

(a) positioning a package with initial height and width dimensions to be tested at a test station;

(b) initially moving a loading device into contact with the flexible package in a direction which applies an increasing load to fluid within the package with the load applied to the package being sensed with a sensing device;

(c) moving the loading device an initial distance in the same direction which causes the sensed load to equal a set load;

(d) defining as a reference position of the loading device an actual position of the loading device when the set load is sensed by the sensing device;

(e) stopping movement of the loading device when the set load has been sensed by the sensing device for a time interval sufficient to permit the package to expand at the test station which drops the load sensed by the sensing device below the set load;

(f) moving the loading device an additional distance from the reference position in the same direction to further decrease the height of the package where the set load is applied to the package; and (g) accepting the package if the movement of the loading device the additional distance from the reference position causes the load sensed by the sensing device to at least equal the set load and the additional distance of movement from the reference position, which further decreased the height of the package, falls within a set range defining an acceptable minimum and maximum height of the package.

2. A process in accordance with claim 1 further comprising:

(h) rejecting the package if the movement of the loading device from the reference position the additional distance does not cause the sensed load to at least equal the set load or if the sensed load at least equals the set load and the movement of the loading device the additional distance from the reference position does not fall within the range defining the acceptable minimum and maximum height of the package.

3. A process in accordance with claim 2 further comprising:

positioning sequentially in time a plurality of packages at the test station with a conveyor system;

repeating steps (a)–(h) for each of the plurality of packages to be sequentially positioned at the test station; and packing a plurality of the accepted packages within a case using a case packing machine with the packages being stacked by the case packing machine in a predetermined stacked packing configuration with a total height of the plurality of the accepted packages in the stacked packing configuration falling within a permissible range of height of the stacked packing configuration between a minimum and a maximum height for which the case packing machine operates without packing error.

4. A process in accordance with claim 1 wherein:

the set load, the minimum height, the maximum height and the additional distance is programmed into a controller of an apparatus controlling the process before positioning of the package at the test station.

5. A process in accordance with claim 2 wherein:

the set load, the minimum height, the maximum height and the additional distance is programmed into a controller of an apparatus controlling the process before positioning of the package at the test station.

6. A process in accordance with claim 3 wherein:

the set load, the minimum height, the maximum height and the additional distance is programmed into a controller of an apparatus controlling the process before positioning of any of the packages at the test station.

7. A process in accordance with claim 1 wherein:

the moving of the loading device is powered with a stepping motor; and the sensing of the load on the flexible package is sensed with a strain gauge.

8. A process in accordance with claim 2 wherein:

the moving of the loading device is powered with a stepping motor; and the sensing of the load on the flexible package is sensed with a strain gauge.

9. A process in accordance with claim 3 wherein:

the moving of the loading device is powered with a stepping motor; and the sensing of the load on the flexible package is sensed with a strain gauge.

10. A process in accordance with claim 4 wherein:

the moving of the loading device is powered with a stepping motor; and the sensing of the load on the flexible package is sensed with a strain gauge.

11. A process in accordance with claim 5 wherein:

the moving of the loading device is powered with a stepping motor; and the sensing of the load on the flexible package is sensed with a strain gauge.

12. A process in accordance with claim 6 wherein:

the moving of the loading device is powered with a stepping motor; and the sensing of the load on the flexible package is sensed with a strain gauge.

13. A process in accordance with claim 1 wherein:

the packages are provided to the conveyor system with a packaging machine.

14. A process in accordance with claim 2 wherein:

the packages are provided to the conveyor system with a packaging machine.

15. A process in accordance with claim 3 wherein:

the packages are provided to the conveyor system with a packaging machine.

16. A process in accordance with claim 4 wherein:

the packages are provided to the conveyor system with a packaging machine.

17. A process in accordance with claim 5 wherein:

the packages are provided to the conveyor system with a packaging machine.

18. A process in accordance with claim 6 wherein:

the packages are provided to the conveyor system with a packaging machine.

19. A process In accordance with claim 7 wherein:

the packages are provided to the conveyor system with a packaging machine.

20. A process in accordance with claim 8 wherein:

the packages are provided to the conveyor system with a packaging machine.

21. A process in accordance with claim 9 wherein:
the packages are provided to the conveyor system with a packaging machine.

22. A process in accordance with claim 9 wherein:
the packages are provided to the conveyor system with a packaging machine.

23. A process in accordance with claim 1 wherein:
the set range is determined by testing a plurality of packages with the set load and determining the additional distance of movement of the sensing device for all acceptable packages at which the set load is sensed to have been reached; and setting the set range of acceptable minimum and maximum package height as a function of the determined additional distance.

24. A process in accordance with claim 23 wherein:
the set range of acceptable minimum and maximum package height as a function of the determined additional distance is an average of the determined additional distance of each of the tested plurality of packages all of the acceptable.

25. A process in accordance with claim 2 wherein:
the flexible package contains solid foodstuffs and gas.

26. A process in accordance with claim 2 wherein:
the flexible package contains a liquid and gas.

27. A process in accordance with claim 2 wherein:
the flexible package contains a solid and a gas.

28. A process in accordance with claim 3 wherein:
the flexible package contains solid foodstuffs and gas.

29. A process in accordance with claim 3 wherein:
the flexible package contains a liquid and gas.

30. A process in accordance with claim 3 wherein:
the flexible package contains a solid and a gas.

31. A process for testing seal quality of a flexible package containing stored producting and fluid therein comprising:
(a) positioning a package with initial height and width dimensions to be tested at a test station;
(b) initially moving a loading device into contact with the flexible package in a direction which applies an increasing load to fluid within the package with the load applied to the package being sensed with a sensing device; (c) moving the loading device an initial distance in the same direction which causes the sensed load to equal a set load;
(d) stopping movement of the loading device when the set load has been sensed by the sensing device for a time interval sufficient to permit the package to expand at the test station which drops the load sensed by the sensing device below the set load;
(e) moving the loading device in the same direction an additional distance over a testing time interval to further decrease the height of the package where the seat load is applied to the package while sensing the load on the package with the sensing device to expel fluid from the package during the testing time interval if leaks are present in the package; and
(f) rejecting the package after completion of moving the loading device the additional distance if the sensing device detects a drop in the load sensed over the testing time interval and accepting the package if the sensing device does not detect a drop in the load sensed over the testing time interval.

32. A process in accordance with claim 31 further comprising:

(g) stopping movement of the loading device after moving the loading device the additional distance for another time interval sufficient to permit the package to expand if the package is not fully expanded;
(h) moving the loading device in the direction another additional distance over another testing time interval to expel fluid from the package during the another testing time interval if leaks are present in the package; and
(i) rejecting the package after completion of moving the loading device the another additional distance if the sensing device detects a drop in the load sensed over the another testing time interval and accepting the package if the sensing device does not detect a drop in the load sensed over the another testing time interval.

33. A process in accordance with claim 32 further comprising:
repeating at least once steps (g), (h) and (i).

34. An apparatus for testing seal quality and height of flexible packages containing stored products and fluid therein comprising:
a test station;
a load sensor for sensing a load applied to the packages at the test station and producing an electrical signal representing the load applied to the packages at the test station;
a loading device for applying a load to the packages at the test station;
an actuator for moving the loading device in a direction into contact with the flexible packages at the test station which applies an increasing load to fluid within the packages;
a prime mover for providing power to the actuator for causing the actuator to move the loading device;
a system for moving the packages to the test station for testing and removing the packages from the test station after testing is completed and for designating the packages as accepted or rejected packages; and
a controller, electrically coupled to the load sensor, the prime mover and the system for moving packages, for determining a position of the loading device, for monitoring the sensed load, for controlling operation of the system for moving packages, for controlling an application of power to the prime mover to provide power to the actuator to cause movement of the loading device in the direction so that the loading device is initially moved into contact with the flexible package to apply an increasing load to the fluid within the package until the controller receives from the load sensor an electrical signal representing that the sensed load equals a set load, for defining a reference position of the loading device when the set load is sensed to have been reached, for causing movement of the loading device to Stop when the set load has been sensed by the sensing device for a time interval sufficient to permit the packages to expand at the test station which then drops the load sensed below the set load, for causing the loading device to be moved a distance from the reference position in the same direction for causing the package to be moved from the test station by the system for moving packages and classifies the package as an acceptable package if the movement of the loading device from the reference position causes the load sensed by the sensing device to at least equal the set load and the distance of movement from the reference position falls within a set range defining an acceptable minimum and maximum height of the package, and for causing the package to be moved from the test station and classified as a rejected package if the movement the distance from the reference position does not cause the sensed load to at least equal the set load or if the sensed load at least equals the set load and the movement of the loading device by the distance from the reference position does not fall within the range defining the acceptable minimum and maximum height for the package.

35. An apparatus in accordance with claim 34 further comprising:

a case packaging machine, in line with the system for moving the packages, for packing accepted packages in a predetermined configuration into cases with a height of a plurality of the accepted packages in the stacked packing configuration falling within a permissible range of height of the stacked packing configuration between a minimum and maximum height for which the case packing machine operates without packing error.

36. An apparatus in accordance with claim 34 wherein:

the load sensor is a strain gauge;

the prime mover is a stepping motor; and the controller is a programmed microprocessor.

37. An apparatus in accordance with claim 35 wherein:

the load sensor is a strain gauge;

the prime mover is a stepping motor; and the controller is a programmed microprocessor.

38. An apparatus in accordance with claim 34 wherein:

the controller determines the set range by controlling testing of a plurality of packages with the set load and determines the additional distance of movement of the sensing device for all of the acceptable packages at which the set load is sensed to have been reached and sets the set range as a function of the determined additional distance.

39. An apparatus in accordance with claim 38 wherein:

the function of the determined distance is an average of the additional distance for the tested plurality of all acceptable packages.

* * * * *